US012775641B2

(12) United States Patent
Ferrentino et al.

(10) Patent No.: US 12,775,641 B2
(45) Date of Patent: Oct. 27, 2026

(54) KNOWLEDGE SEARCH SYSTEM

(71) Applicant: Yext, Inc., New York, NY (US)

(72) Inventors: Marc Ferrentino, New York, NY (US); Han Byul Ru, Astoria, NY (US); Kevin Caffrey, Tysons Corner, VA (US); Maxwell Shaw, Arlington, VA (US); Jonathan Kennell, New York, NY (US); Catherine Frailey, New York, NY (US); Jeremy Clark, Raleigh, NC (US); Steven Sanshwe, Brooklyn, NY (US); Thomas C. Dixon, New York, NY (US); Jacob Fancher, New York, NY (US)

(73) Assignee: Yext, Inc., New York, NY (US)

( * ) Notice: Subject to any disclaimer, the term of this patent is extended or adjusted under 35 U.S.C. 154(b) by 13 days.

(21) Appl. No.: 18/750,608

(22) Filed: Jun. 21, 2024

(65) Prior Publication Data

US 2024/0346052 A1 Oct. 17, 2024

Related U.S. Application Data

(63) Continuation of application No. 17/550,454, filed on Dec. 14, 2021, now Pat. No. 12,056,164, which is a (Continued)

(51) Int. Cl.
*G06F 16/28* (2019.01)
*G06F 16/23* (2019.01)
(Continued)

(52) U.S. Cl.
CPC ........ *G06F 16/288* (2019.01); *G06F 16/2379* (2019.01); *G06F 16/245* (2019.01); *G06Q 10/0631* (2013.01)

(58) Field of Classification Search
CPC ............... G06F 16/242; G06F 16/2423; G06F 16/2425; G06F 16/2428; G06F 16/245; G06F 16/248; G06Q 30/02; H04M 7/0021
See application file for complete search history.

(56) References Cited

U.S. PATENT DOCUMENTS 10,103,953 B1 10/2018 Chang et al.
10,489,462 B1 11/2019 Rogynskyy et al.
(Continued)

FOREIGN PATENT DOCUMENTS

JP H11328218 A 11/1999
JP 2001222551 A 8/2001
(Continued)

OTHER PUBLICATIONS

Japanese Notice of Reasons for Refusal in corresponding Japanese Application No. 2024-120679 mailed Jul. 1, 2025 (6 pages).
(Continued)

*Primary Examiner* — James E Richardson
(74) *Attorney, Agent, or Firm* — Jeffri A. Kaminski; Venable LLP

(57) ABSTRACT

A system and method to manage data associated with a merchant system to provide in response to a search query from an end user system. The system and method to generate, in a data graph associated with a merchant system, a first entity type including a first data field storing a first data value corresponding to the merchant system. A second entity type comprising a second data field storing a second data value corresponding to the merchant system is generated in the data graph. A relationship type between the first entity type and the second entity type is established. A first update to the first data value of the first entity type is generated. In view of the relationship type, a second update to the second data value of the second entity type is generated. The first (Continued)

update of the first entity type and the second update of the second entity type are stored in the data graph.

13 Claims, 18 Drawing Sheets

Related U.S. Application Data continuation of application No. 16/661,641, filed on Oct. 23, 2019, now Pat. No. 11,222,048.

(60) Provisional application No. 62/749,457, filed on Oct. 23, 2018.

(51) Int. Cl.

| | |
|---|---|
| ***G06F 16/245*** | (2019.01) |
| ***G06Q 10/0631*** | (2023.01) |

(56) References Cited

U.S. PATENT DOCUMENTS

| | | | | |
|---|---|---|---|---|
| 10,545,975 | B1 * | 1/2020 | Mahdy | G06F 16/2425 |
| 11,222,048 | B2 | 1/2022 | Dixon et al. | |
| 12,056,164 | B2 | 8/2024 | Clark et al. | |
| 2002/0065737 | A1 * | 5/2002 | Aliabadi | G06Q 30/06 705/26.64 |
| 2003/0220915 | A1 * | 11/2003 | Fagan | G06F 16/38 |
| 2005/0120006 | A1 | 6/2005 | Nye | |
| 2007/0073696 | A1 | 3/2007 | Reynar et al. | |
| 2008/0104084 | A1 | 5/2008 | Chavda et al. | |
| 2010/0121877 | A1 | 5/2010 | Fawcett et al. | |
| 2010/0161492 | A1 | 6/2010 | Harvey et al. | |
| 2011/0106966 | A1 | 5/2011 | Smit | |
| 2011/0276396 | A1 | 11/2011 | Rathod | |
| 2012/0158465 | A1 * | 6/2012 | Golembiewski | G06Q 10/06 705/7.42 |
| 2012/0233250 | A1 | 9/2012 | Man et al. | |
| 2013/0086032 | A1 | 4/2013 | Lundberg | |
| 2013/0110766 | A1 | 5/2013 | Promhouse et al. | |
| 2013/0173654 | A1 | 7/2013 | Lerman et al. | |
| 2014/0129591 | A1 | 5/2014 | Lerman et al. | |
| 2014/0278916 | A1 | 9/2014 | Nukala et al. | |
| 2014/0279078 | A1 | 9/2014 | Nukala et al. | |
| 2015/0019540 | A1 | 1/2015 | Ganjam et al. | |
| 2015/0081440 | A1 | 3/2015 | Blemaster | |
| 2015/0095303 | A1 | 4/2015 | Sonmez et al. | |
| 2015/0199378 | A1 | 7/2015 | Reyntjens | |
| 2015/0213094 | A1 | 7/2015 | Lou et al. | |
| 2015/0269231 | A1 | 9/2015 | Huynh et al. | |
| 2016/0125041 | A1 * | 5/2016 | Smith | G06Q 30/0254 707/770 |
| 2016/0125498 | A1 | 5/2016 | Setty et al. | |
| 2016/0132922 | A1 | 5/2016 | Wang et al. | |
| 2018/0082183 | A1 | 3/2018 | Hertz et al. | |
| 2018/0165648 | A1 | 6/2018 | Berry | |
| 2018/0210913 | A1 | 7/2018 | Beller et al. | |
| 2018/0300345 | A1 * | 10/2018 | Brette | G06F 16/22 |
| 2019/0251205 | A1 | 8/2019 | Su et al. | |
| 2019/0347668 | A1 | 11/2019 | Williams et al. | |
| 2019/0354544 | A1 | 11/2019 | Hertz et al. | |
| 2019/0378010 | A1 | 12/2019 | Morris et al. | |

FOREIGN PATENT DOCUMENTS

| | | |
|---|---|---|
| JP | 2016517599 A | 6/2016 |
| JP | 2017522627 A | 8/2017 |
| WO | 2020086722 A1 | 4/2020 |

OTHER PUBLICATIONS

International Search Report and Written Opinion in International Application No. PCT/US2019/057670 dated Jan. 14, 2020 (9 pages).

European Supplemental Search Report in corresponding European Application No. 19 875 865.8 dated Jun. 15, 2022 (3 pages).

European Communication from the Examining Division with Annex in corresponding European Application No. 19 875 865.8 dated Jun. 27, 2022 (5 pages).

European Summons to Attend Oral Proceedings with Annex in corresponding European Application No. 19 875 865.8 dated Apr. 20, 2023 (6 pages).

Chinese Office Action in corresponding Chinese Application No. 201980082348.0 dated Jun. 7, 2023 (22 pages).

Canadian Office Action (Requisition by the Examiner) in corresponding Canadian Application No. 3, 117,203 dated Sep. 11, 2023 (3 pages).

Japanese Office Action in corresponding Japanese Application No. 2021-522512 mailed Oct. 3, 2023 (8 pages).

Australian Examination Report No. 1 in corresponding Australian Application No. 2019366949 dated Oct. 20, 2023 (3 pages).

Chinese Notice of Grant of Patent Right for Invention in corresponding Chinese Application No. 201980082348.0 dated Mar. 4, 2024 (3 pages).

Japanese Office Action in corresponding Japanese Application No. 2021-522512 mailed Mar. 12, 2024 (10 pages).

Canadian Notice of Allowance in corresponding Canadian Application No. 3,117,203 dated Sep. 4, 2025 (1 page).

Canadian Office Action (Requisition by the Examiner) in corresponding Canadian Application No. 3,117,203 dated May 8, 2024 (3 pages).

Japanese Decision to Grant a Patent in corresponding Japanese Application No. 2021-522512 mailed Jun. 27, 2024 (5 pages).

Canadian Office Action in corresponding Canadian Application No. 3,117,203 dated Jun. 16, 2026 (3 pages).

* cited by examiner

FIG. 7B

Knowledge Search System Listings Pages Search Reviews Analytics Applications Knowledge Search Analytics Configuration

Searchable Attributes

Configure which attributes can be searched in our search bar. The order below determines the order which results are shown.

Add Attribute

| Data Source | Type | Possible Values | Allow Typos? | Section |
|---|---|---|---|---|
| Doctor Name | Entity | 5,324 | Yes | Provider Name |
| Practice Name | Entity | 11,734 | Yes | Practice Name |
| Doctor Provider Types | Field Value | 8 | Yes | Provider Type |
| Doctor Conditions | Field Value | 2,384 | Yes | Condition |
| Doctor Specialities | Field Value | 384 | Yes | Specialty |

Other Settings

| | |
|---|---|
| Answer Box Key | Specialty |
| API Key | 230842398s37cw02384 |
| Group Results in Sections | Yes |
| Maximum Results per Section | 5 |
| Maximum Sections | 5 |
| Include Places Search | Yes |

Test out your Search Bar

Staging Production

Query

KNOWLEDGE SEARCH SYSTEM

CROSS REFERENCE TO RELATED APPLICATIONS

This application is a Continuation of U.S. patent application Ser. No. 17/550,454, filed on Dec. 14, 2021, which is a continuation application of U.S. patent application Ser. No. 16/661,641, filed on Oct. 23, 2019, now issued Jan. 11, 2022 as U.S. Pat. No. 11,222,048, titled "KNOWLEDGE SEARCH SYSTEM", which claims the benefit of U.S. Provisional Application No. 62/749,457, filed Oct. 23, 2018, titled "KNOWLEDGE SEARCH SYSTEM", the contents of which are incorporated herein in their entireties.

TECHNICAL FIELD

The disclosure relates generally to a knowledge search platform, and more particularly to a search platform having searchable elements that are customizable by an entity.

BACKGROUND

Historically, an enormous amount of time, money, and effort has been expended by merchants (e.g., businesses and individuals) in order to publish information (e.g., advertisements) regarding their products and services to consumers (e.g., end users) in an electronic environment. For generations, various media have been used to realize such business matters. The pervasive nature of open networks, such as the Internet, has provided a global means to attract new customers and retain old customers.

The end users may use a search engine to obtain merchant-related information published and accessible via a network (e.g., the Internet). Search engines are software programs that search databases, and collect and display information related to search terms specified by an end user. The merchant's interaction with the search engine is an important factor in the merchant's ability to reach end users and provide the end users with quality information about the merchant that is responsive to the end user's search query.

BRIEF DESCRIPTION OF THE FIGURES

The present disclosure will be understood more fully from the detailed description given below and from the accompanying drawings of various implementations of the disclosure.

FIGS. 7A-7B show example interfaces relating to management of analytics by a knowledge search system, according to embodiments of the present disclosure.

DETAILED DESCRIPTION

Figure 1:
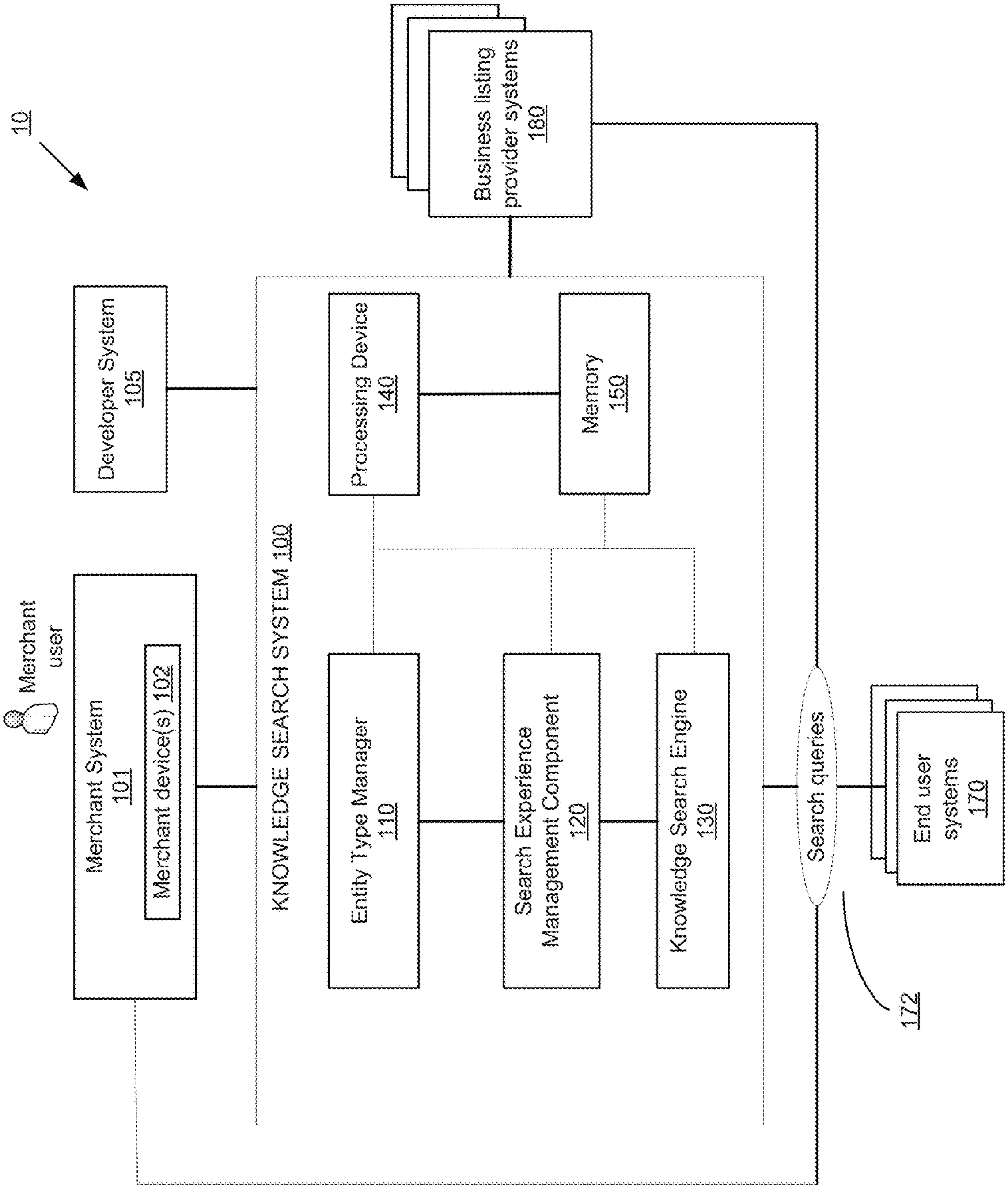
FIG. 1 illustrates an example environment that includes a knowledge search system, according to embodiments of the present disclosure.

To find relevant data with respect to a query received from an end user (e.g., a user initiating a search via a web interface), many search engines use a keyword search based on text data provided by the end user. In conducting the search, the end user seeks to identify a web element (e.g., a webpage) that is responsive to the query that is copied and indexed by a search engine based on the keywords in the search query input. If any of the keywords are incorrect (e.g., incomplete, include a typographical error, misspelled, etc.) or not indexed by the search engine, the information the end user seeks may not be identified or discovered in response to the query. If the combination of keywords in the search query matches a large number of webpages, information about those webpages (e.g., links) may be listed on several search result webpages. This may require the end user to manually click on multiple links and sort through hundreds or thousands of similar webpages before finding the desired information. In other situations, the requested information responsive to the user query may not be found due to a gap (e.g., a lack of content) between the keywords of the end user's query and the online data associated with the entity (e.g., a merchant). As such, the amount of information and misinformation that the end user must negotiate to find a particular product or service can produce an overly time-consuming process that results in the end user abandoning the search effort before obtaining the desired information, which can result in a lost business opportunity for the merchant associated with the search query.

Embodiments of the disclosure address the above-mentioned problems and other deficiencies with conventional search engine technologies by providing a knowledge search system that enables end users (e.g., an individual using a search engine to obtain knowledge or information about a merchant, product, or service) to employ one or more knowledge search features to generate an improved searching experience. In an embodiment, knowledge can be defined as "facts", information, or data regarding a subject that can be stored in a data store (e.g., a database) and queried to produce a responsive search result. In some embodiments, the knowledge search engine platform includes a natural language processor that can process search query hints and auto completion techniques to intuitively guide the end user toward a helpful response. The knowledge search processing is conducted by the knowledge search engine platform based on information about certain data associated with the business product data.

In an embodiment, a merchant user (i.e., a user operating on behalf of a business entity; also referred to as an "entity user") can use the knowledge search system of the present disclosure to manage and centralize structured data relating to the entity (e.g., a company), and surface the entity data on an electronic platform (e.g., a first-party website associated with the entity or a third-party website). In an embodiment, the entity data can be provided via the knowledge search system to multiple different publisher systems (e.g., websites, social media platforms, search engine platforms, etc., such as Google™, Facebook™, Bing™, Apple™, etc.).

In an embodiment, the knowledge search system of the present disclosure can utilize multiple different entity types (e.g., categories or classifiers of information) to organize the searchable information to generate a search result including the desired information in response to a query. The different entity types can be a system-based entity type (e.g., a default entity type generated by the knowledge search system and used by multiple different entities; also referred to as a "system entity type") and a customized entity type (e.g., an entity type generated by the knowledge search system in accordance with instructions from a particular entity). In an embodiment, the customized entity types (also referred to as "custom entity types") can be generated, selected, and managed by an entity to provide a searchable informational element for us in generating search results in response to an end user search.

In an embodiment, a custom entity type can be mapped, linked, associated with, or logically connected to another entity type via a relationship type. In an embodiment, a relationship type can include a defined association between multiple entity types. For example, multiple custom entity types can be associated by one or more relationship types. In another example, a custom entity type and a system entity type can be linked by one or more relationships types. Advantageously, the customized entity types and relationship types enable an entity user to update entity data via the knowledge search system (e.g., at a single "location" or via a system) and have the entity data updated on and across multiple different publisher systems (e.g., multiple different search engines). In this regard, via a single interaction, an entity user (e.g., a company) can update entity data by updating, adding, modifying, changing, etc. data associated with a first entity type and have a corresponding data update executed with respect to other entity types that are associated with the first entity type by one or more established relationship types. This enables the entity data to be updated across multiple different publisher systems to establish uniformity and consistency in the type, quality, and accuracy of the entity data returned by the different publisher systems to an end user in response to a query.

FIG. 1 illustrates an example environment 10 including a knowledge search system 100 operatively coupled to one or more merchant systems 101. In one embodiment, the knowledge search system 100 enables a user (herein referred to as a "merchant user") operating a communicatively connected merchant device 102 on behalf of the merchant system 101 to enhance one or more business listings associated with the merchant in accordance with one or more aspects of the disclosure.

According to embodiments, the knowledge search system 100 includes modules configured to perform various functionality, operations, actions, and activities, as described in detail herein. In an embodiment, the knowledge search system 100 includes an entity type manager 110, a search experience management component 120, and a knowledge search engine 130 operatively coupled to one or more processing devices 140 and a memory 150. In an embodiment, the memory can include a knowledge search system database configured to store data relating to the knowledge search system 100. In one embodiment, the software modules may be executed on one or more computer platforms of the knowledge search system that are interconnected by one or more networks, which may include the Internet. The software modules may be, for example, a hardware component, circuitry, dedicated logic, programmable logic, microcode, etc., that may be implemented by a processing device 140 executing instructions stored by the memory 150 of the knowledge search system 100.

In some embodiments, the knowledge search system 100 may generate enhanced business listings for provisioning to an end user system 170 in response to one or more search queries 172 initiated by the one or more end user systems 170 via an interface operatively coupled to the knowledge search engine 130 of the knowledge search system 100. In an embodiment, the search queries 172 can be submitted by one or more end user systems 170 via an interface of the knowledge search system 100, the merchant system 101, and the one or business listing provider systems 180 (e.g., third-party search engines, websites, or applications, such as Google®, Yelp®, Bing®, etc.). As used herein, the term "end user" refers to one or more users operating an electronic device (e.g., end user system 170) to submit a search query 172 to a system (e.g., the merchant system 101, the knowledge search system 100, a business listing provider system 180) to obtain search results associated with a merchant. For example, the end user system 170 may initiate a search by entering a search query via an interface of a webpage of the merchant system 101. In an embodiment, the search results are generated based on merchant information managed by the knowledge search system 100.

In an example, the end user system may be a customer or prospective customer searching for information about one or more merchants. In an embodiment, the knowledge search system 100 may be communicatively connected to the end user system 170 and operates to respond to a search query 172.

In an embodiment, the knowledge search system 100 is operatively coupled to the one or more merchant systems 101, the one or more end user systems 170, and the business listing provider systems 180 via a suitable network (not shown), including, for example, the Internet, intranets, extranets, wide area networks (WANs), local area networks (LANs), wired networks, wireless networks, or other suitable networks, etc., or any combination of two or more such networks. In one embodiment, the knowledge search system 100 includes a processing device 140 and a memory 150 configured to execute and store instructions associated with the functionality of the various components, services, and modules of the knowledge search system 100, as described in greater detail below in connection with FIGS. 1-11.

In one embodiment, the merchant system 101 may include one or more components of the knowledge search system 100. In this embodiment, the merchant system 101 and the knowledge search system 100 may be integrated such that the merchant system 101 employs the knowledge search system 100 and its related functionality to respond to one or more search queries 172 received from a communicatively connected end user system 170. According to embodiments of the present disclosure, as shown in FIG. 1, the user device 130 may submit a search query 172 to the merchant system 101 (wherein the merchant system 120 is integrated with the knowledge search system 100) and/or submit a search query 172 associated with the merchant system 120 to the knowledge search system 101.

The merchant, via the merchant system 101, may use the knowledge search system 100 to manage its data (also referred to as "merchant data") on the knowledge search system 100 and "push" or otherwise provision that merchant data to the end users (e.g., customers) in response to the search queries 172 and/or "push" or otherwise provision the merchant data to one or more business listing providers systems 180. In that regard, the merchant system 101 controls the data that is being returned to the end user from the knowledge search system 100. In other embodiments, at least a portion of the merchant data may be "pulled" or otherwise received from another system, such as a website associated with the merchants or other type of search websites. In one embodiment, the merchant user uses the merchant system 101 to communicate with the knowledge search system 100 to request changes to merchant data (e.g., data that may be provided to an end user in response to an associated input query 140).

In some embodiments, the merchant system 101 and business listing provider systems 180 include one or more modules (e.g., APIs) with which the knowledge search system 100 interacts for carrying out operations and providing relevant merchant data to the end user systems 170. For example, the merchant system 101 and business listing provider systems 180 may include APIs to access one or more prescribed databases dedicated to storing information (e.g., merchant data) regarding the products, services, employees, events, etc. of a particular merchant. In other embodiments, the knowledge search system 100 may include a database storing all or a portion of the merchant data. For example, the knowledge search system 100 may include one or more prescribed databases dedicated to storing the information related to the merchant data.

As shown in FIG. 1, the knowledge search system 100 may include multiple modules executed on one or more computer platforms that are interconnected by one or more networks, which may include any suitable network, such as the Internet. In some embodiments, the modules may include one or more hardware components, circuitry, dedicated logic, programmable logic, microcode, etc., and one or more sets of instructions executable by one or more processing devices of the knowledge search system 100. The modules may include, for example, (1) an entity type manager 110 configured to enable merchant systems 101 to establish customized entity types and relationship types associating multiple entity types as it relates to the merchant data, (2) a search experience management component 120 to enable a merchant system 101 to configure or customize a set or collection of input fields to define a search experience that can be presented to and used by an end user system 170 to conduct a search relating to the merchant (e.g., wherein the search experience is provided to the end user via an interface of a website of the merchant system), (3) a knowledge search engine 130 to provide enhanced website searches by analyzing a search query initiated by an end user system 170 to identify a natural language inquiry associated with questions about a particular merchant (e.g., merchant data relating to products, services, employees, events, locations, etc.).

In an embodiment, the knowledge search system 100 is configured to communicate with the merchant systems 101, the end user systems 170, and the business listing provider systems 180 across various specialized technologies based on such factors, as distance, prominence, traffic, cultural relevance, industry relevance, event type relevance, directory versus editorial sites, paid versus free, long-term versus last-minute planning, etc.

The entity type manager 110 allows merchant systems 101 (e.g., merchant users) to interact with the knowledge search system 101 to perform various operations, such as, for example, generating customized entity types associated with the merchant data and establishing relationships (i.e., relationship types) between multiple different entity types associated with the merchant data.

In an embodiment, an end user may use a user device 130 to submit a suggested or requested change or edit to a portion of the merchant information provisioned to the end user in response to a search query 172 (e.g., the end user may suggest a change to the operating hours of the merchant if the end user determines that the published hours are incorrect). In response, the knowledge search system 100 reviews the proposed or suggested change and provides the change request to the merchant system. In an embodiment, the knowledge search system 100 can update information associated with a merchant and provide a notification of the update or change to the merchant system 101. In an embodiment, the knowledge search system 100 collects updated information associated with the merchant and provide the updated information to the merchant system 101 for review and approval prior to adoption of the update or change.

In some embodiments, the knowledge search system 100 enables merchant users to interact with their end users via conversational user interface (UI). The merchant users may opt-in to this feature of the knowledge search system 100 by entity and/or by interaction type. In some embodiments, the merchant users add a phone number and/or account information for each interaction type on the entity (without associating to user). In some embodiments, the knowledge search system 100 may auto-enable the merchant system for certain account types or businesses and use customer matching API to collect social media-related information about the merchant user (e.g., an end user's Facebook™ identifier). In an embodiment, in response to the knowledge search system 100 registering a location with a merchant with and confirming that the merchant user has a validated phone or social media account linked (depending on the interaction type), the knowledge search system 101 may engage with the merchant user on the associated social network platform.

According to an embodiment of the present disclosure, the knowledge search engine 130 executes searches based on input from the end user (e.g., search queries 172 submitted by an end user system 170 via an interface operatively coupled to the knowledge search system 100). In one embodiment, the search may be conducted based on information inputted by the end user (e.g., their zip code, geolocation or other information that could lead to the determination of the end user's location and/or location of interest). In another embodiment the search may be based on where the end user (e.g., the user device 130) is searching from (for example, the user device's IP address is queried and used in connection with the search). The knowledge search engine 130 may assess the search results to provide recommendations to the merchant user. In one embodiment, the recommendation may be presented to the merchant system 101 as a notification provided by the knowledge search system 100.

In another embodiment, the knowledge search system 100 provides one or more recommendations to a merchant system 101 to improve the content of search results relating to the merchant, as described in detail herein. For example, a search of competitor information published in indexed search engine databases may be performed by the knowledge search engine 130. For example, the knowledge search system 100 can determine that a competitor associated with a merchant published several images associated with the competitor's store in an applicable location. In an embodiment, the knowledge search system 100 can send a message (e.g., a text, electronic mail, etc.) to one or more merchant devices 102 associated with the merchant system 101 recommending that the merchant add photos to an applicable business location corresponding to the competitor's place of business. Upon input from the merchant system 101, the knowledge search system 100 may upload photos to one or more business listing provider systems 180.

According to embodiments, the knowledge search system 100 can generate or more interfaces to enable an end user system 170 to perform a search for information. In an embodiment, the one or more interfaces presented by the knowledge search system 100 to an end user system 170 (e.g., via a graphical user interface of a user device employed by the end user) may provide one or more of the following features: 1) performing real-time auto-completion responsive to input entry by the end user (e.g., as the end user types or otherwise enters (e.g., voice dictation) his or her search query) in an example range of less than 100 ms, less than 50 ms, etc.; 2) generating of responsive result cards (e.g., one or more responses to an end user search query including location information including maps, events associated with a merchant, etc.); 3) providing a single-search interface (e.g., a single box) to enable an end user to search for and identify multiple different types of information using a single search query (e.g., a search initiated by a single search action); 4) generating of search results based on incorrect or ambiguous search queries (e.g., a forgiving search configured to manage misspellings and synonyms); 5) generating of a ranked list of search results based on one or more ranking parameters configured to present the search result data in an optimized manner for consumption by the end user; 6) generating search results including one or more sections to differentiate the search results; 7) generating of search results including highlighting of one or more "matched" search terms; 8) conduct a search for properties relating to the search in addition to related entities; 9) enabling keyboard navigation to allow the end user to use arrow keys and enter to navigate a user-friendly search experience.

As shown in FIG. 1, the knowledge search system 100 can be operatively coupled to one or more developer systems 105 to provide a developer with enhanced and improved functionality. In an embodiment, the knowledge search system 100 provides one or more developer systems 105 with a JavaScript library configured to wrap an associated application programming interface (API) to facilitate the display of an associated user interface (UI). In an embodiment, the knowledge search system provides an improved API enabling a developer system 105 to make one API call to search all available databases and return results in a structured format. Advantageously, the aforementioned features enable the knowledge search system 100 to reduce latency and costs experienced by developer users employing a mobile device by reducing API calls and associated processing time and resource expenditure.

Figure 2:
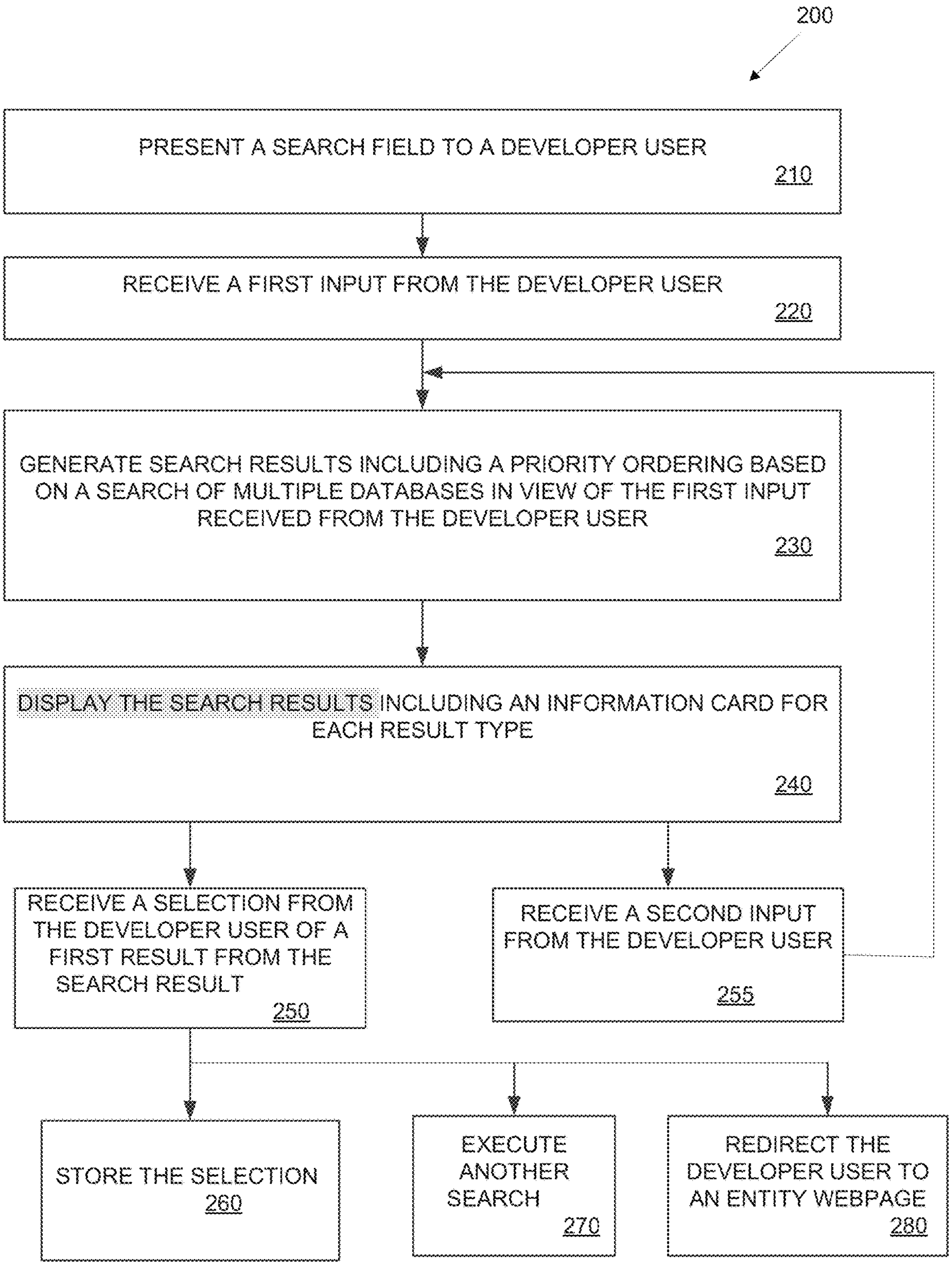
FIG. 2 is a flow diagram of an example method to generate search results in response to a search query from a developer system, according to embodiments of the present disclosure.
Figure 3:
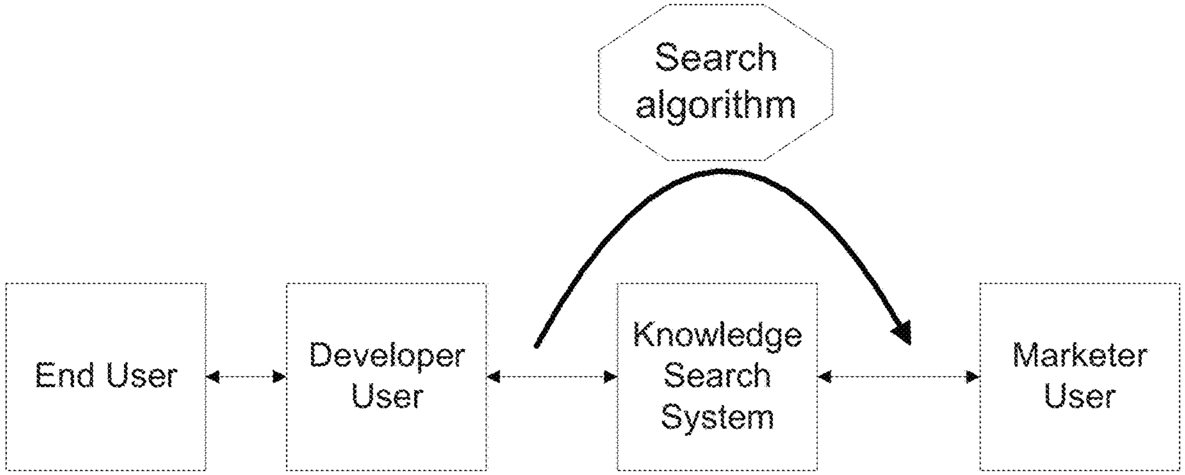
FIG. 3 illustrates a diagram including a knowledge search system configured to execute a search algorithm and operatively couple to a developer user system and marketer user system, according to embodiments of the present disclosure.

FIG. 2 illustrates a flow diagram illustrating an example process 200 including steps performed by a knowledge search system (e.g., knowledge search system 100 of FIG. 1) communicatively connected with a developer user, according to embodiments of the present disclosure.

In block 210, the knowledge search system presents a search field to a developer user (e.g., a device or system operated by a user of the developer system 105). In block 220, the knowledge search system receives a first input from the developer user. In an example, the first input may include one or more characters entered by the developer user in the provided search field.

In block 230, the knowledge search system generates a first set of search results in response to the first input received from the developer user. In an embodiment, the first set of search results may include multiple result entries presented in a priority or ranked order. In an embodiment, the first set of search results may be derived based on a review and analysis of information stored in one or more databases. In an embodiment, depending on the API, the returning of the first set of search results may require multiple complicated API queries to search over multiple fields and entities.

In block 240, the knowledge search system displays the first set of search results. In an embodiment, the search results may include a rendered card for each result type. In one embodiment, the first set of search results may be grouped into multiple sections. In one embodiment, portions of the search results that match a portion of the text associated with the first input may be highlighted.

In block 250, the knowledge search system may receive a selection from the developer user of a first search result from the first set of search results. In an embodiment, the developer user may enter his or her selection using a mouse, keyboard, voice command, touchscreen, or other input device or mechanism. In response to the receipt of the selection, the knowledge search system may store the selection (block 260), execute another search (e.g., show an advisor near a zip code, block 270) or redirect the developer user to an entity webpage (e.g., show event details, block 280).

In an embodiment, in response to displaying the first set of search results in block 240, the knowledge search system may receive a second input (e.g., one or more new characters) from the developer user, in block 255. In response to receipt of the second input, the process may return to block 230 and continue as illustrated.

According to embodiments of the present disclosure, marketers are provided with enhanced and improved functionality by the knowledge search system. In an embodiment, the knowledge search system provides one or more marketers with features and functionality to enable a marketer user to tune their search experience and refine their corresponding search results. In an embodiment, the knowledge search system provides the marketer users with fine-tuned search results based on analytics that enable a marketer user to adjust the search results to improve their quality. In an embodiment, this may be based on generating an understanding of the search performance.

In an embodiment, the knowledge search system provides the marketer users with the ability to change the manner in which the search results are returned or displayed. Conventionally, changing the way search results appear requires a developer to make changes to the UI or the API calls. However, that can become extremely tedious if changes are made frequently.

In an embodiment, the knowledge search system makes the API call "dumb". In an embodiment, instead of performing all of the logic around which fields to search, which entities to search, what ranking to use, etc., the knowledge search system moves that logic behind the API call. In an embodiment, then, within the knowledge search system, the marketer user can control the search result details using the knowledge search system interface. In an embodiment, a search algorithm executed by the knowledge search system moves from the client side to behind the API (e.g., not visible to the front-end developer user), as illustrated in the logical diagram of FIG. 3.

In an embodiment, the knowledge search system includes a JavaScript library, a search API to facilitate "easier" queries, and an improved interface (e.g., a knowledge search interface configured for display via a dashboard) to enable search API configuration and analytics.

In an embodiment, the JavaScript library makes it easier to build a search experience. In an embodiment, a user (e.g., a developer user, a marketer user, etc.) may provide an input, section headers and result cards and the JavaScript library of the knowledge search system shows the search results and manages the user interaction. In an embodiment, the JavaScript library may automatically send analytics back into the knowledge search system for further review and analysis.

In an embodiment, the knowledge search system may include a search API that allows an end user to search multiple fields and multiple entities of a collection of information (also referred to as a "knowledge graph") in a single API call (e.g., a single search action in response to a single indication by the end user system). In an embodiment, the search experience management component 120 of the knowledge search system 100 can be used by a merchant system 101 to configure a search experience interface defined by multiple input fields and entity types that are searched in a single API call. In an embodiment, the knowledge search system may employ one or more API filters to enable an end user to engage with a search experience interface to execute a search across multiple fields and multiple entities in a single API call. In an example, the API call itself is "dumb" and may be structured according to the following example structure:

```
{
searchInstance: "primary",
query: "onward",
}
```

In some embodiments, the knowledge search system 100 allows merchant systems 101 to generate one or more search experience interfaces which include curated search results that are displayed to an end user system 170 in response to a search query 172. In an embodiment, a search experience interface (also referred to as a "think experience" or "think experience interface") can include a collection of input fields (e.g., identified based on input from the merchant system 101) configured to receive search terms from an end user system as part of a search query. In some embodiments, different search experience interfaces can be created for different webpages on a merchant website. For example, a merchant user may create a first search experience interface for a merchant store locator webpage, a second search experience interface for a merchant menu item finder webpage and a third search experience interface for a merchant event calendar webpage. According to embodiment, a merchant system 101 can create multiple different search experience interfaces using the search experience management component 120 to deploy via multiple webpages of the merchant system 101 for use by the end user systems 170.

In an embodiment, one or more different data types can be used to generate a search experience interface including multiple different input fields. In some embodiments, an example data type that can be used to define a search experience interface is one or more input fields. In an embodiment, an input field is a group of searchable attributes. In an embodiment, the one or more input fields of a search experience interface can be used to control and manage the input of text associated with a search query inputted via a web page. For example, an input field can be a location selector or a search across an entire knowledge graph (i.e., collection of information). In some embodiments, each search experience interface can contain multiple input fields.

In some embodiments, an input field of a search experience interface can include one or more parameters. In an embodiment, a parameter represents the type of data that can be searched across in a corresponding input field. In an embodiment, each input field includes at least one parameter. Example parameters can include a name, an entity type (e.g., specialty, condition, etc.), an address, etc.

Figure 4:
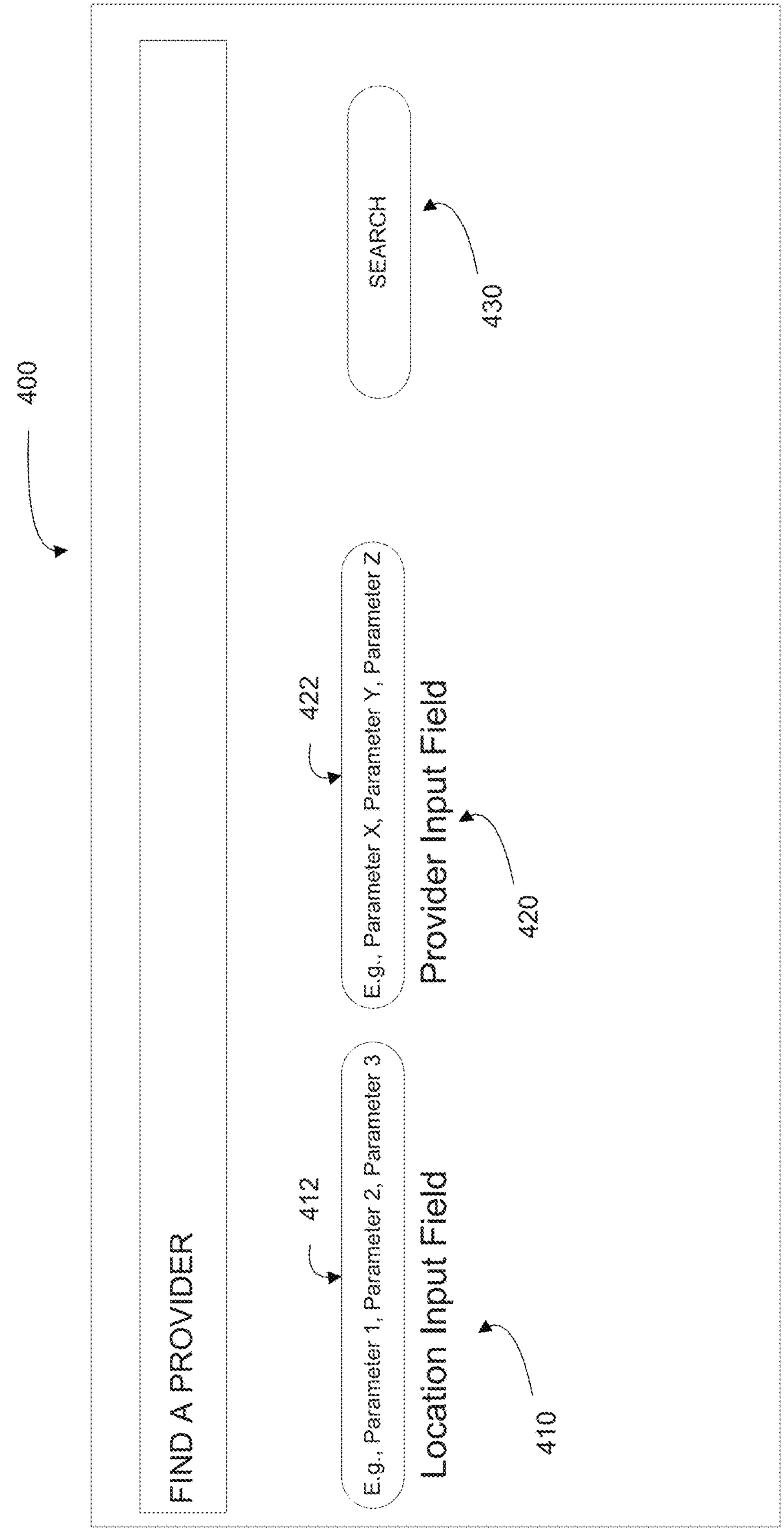
FIG. 4 illustrates an example interface generated by a knowledge search system, according to embodiments of the present disclosure.

FIG. 4 illustrates an example search experience interface 400 generated by the knowledge search system, according to embodiments of the present disclosure. As shown, the search experience interface 400 includes multiple input fields (e.g., a 'location' input field 410 and a 'provider' input field 420) configured to receive one or more search terms relating to the input field category (e.g. location, provider, specialty, etc.). In an embodiment, for each input field 410, 420, an end user can select or input one or more search terms associated with the multiple different parameters 412, 422. For example, the location input field 410 is configured to enable the input of search criteria against a first set of parameters 412 (e.g., Parameter 1, Parameter 2, and Parameter 3) and the provider input field 420 is configured to enable the input of search criteria against a second set of parameters 422 (e.g., Parameter X, Parameter Y, and Parameter Z). In an embodiment, upon execution of a single search can be initiated via a single search action, such as an interaction with the search action button 430. The single search can be executed for the illustrated search experience interface 400 against or using the search terms (e.g., the search criteria) provided for the parameters of multiple input fields. It is noted that a given input field can be associated with any number of parameters, and any number of input fields can be used to generate a search experience interface.

Figure 5:
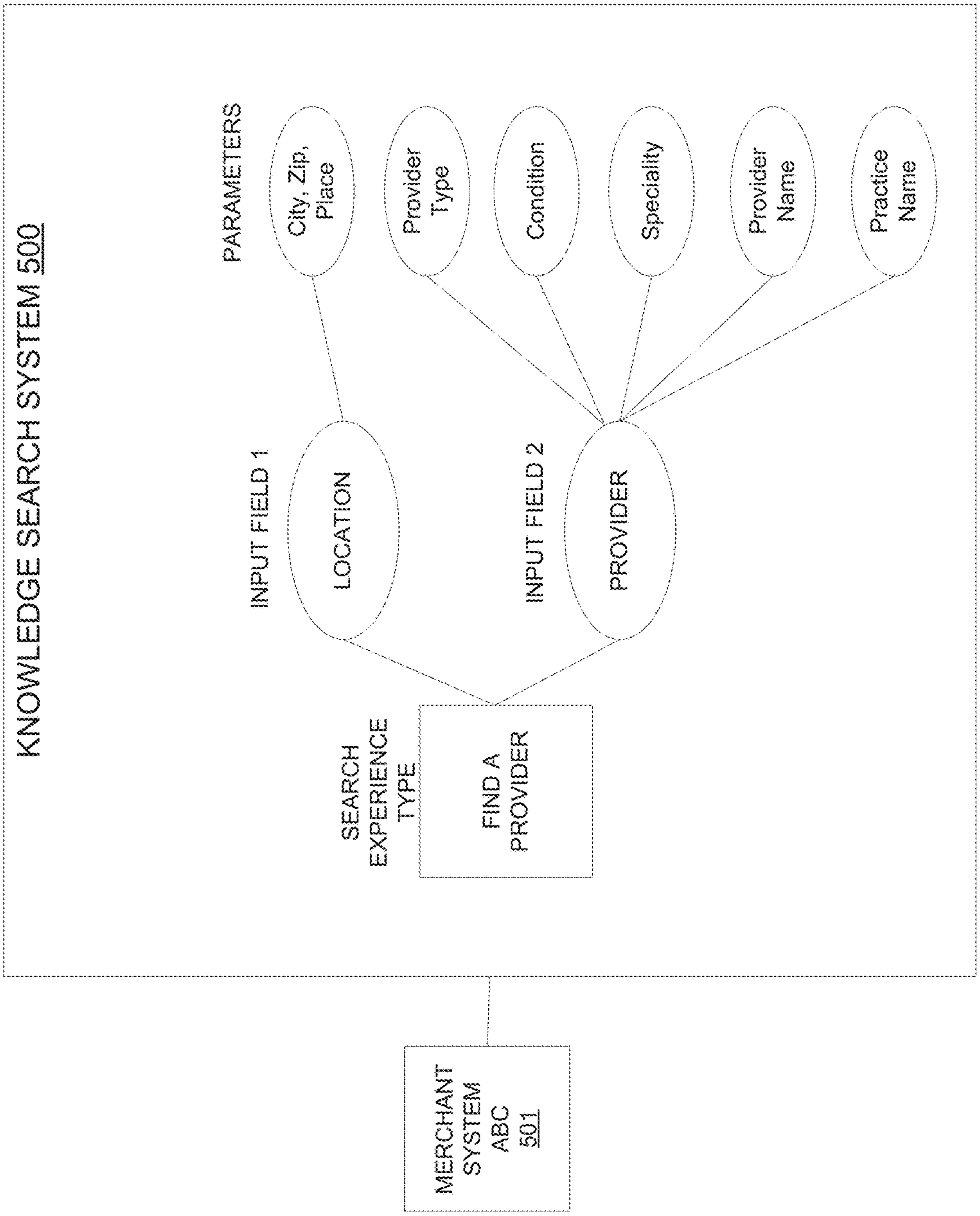
FIG. 5 is a diagram illustrating an example generation of a search experience type by knowledge search system, according to embodiments of the present disclosure.

FIG. 5 illustrates an example generation of a search experience interface by the knowledge search system of the present disclosure. As shown in FIG. 5, a merchant system (e.g., merchant system ABC 501) interacts with the knowledge search system 500 to generate a search experience interface for use with one or more webpages or other interfaces associated with the merchant system ABC 501. In this example, the knowledge search system 500 generates a "Find a Provider" search experience type. In an embodiment, the merchant system ABC 501 selects the following input fields to be included in the "Find a Provider" search experience interfaces: a "Location" input field (i.e., Input Field 1 in FIG. 5) and a "Provider" input field (i.e., Input Field 2 in FIG. 5). In an embodiment, the merchant system ABC 501 selects one or more parameters to associate with each of the input fields (Input Field 1 and Input Field 2). In the example shown, a "City, Zip, Place" parameter field is associated with the Location Input Field. In addition, the Input Field 2 is associated with the following parameters: provider type, condition, specialty, provider name, and practice name. Advantageously, in an embodiment, the parameters can be used to refine the search experience via their association with the corresponding input field. In an embodiment, the input fields and corresponding parameters are displayed to the end user system via the search experience interface. The end user can enter or select one or more search terms for each of the input fields to submit a search query for processing by the knowledge search system.

In an embodiment, the search experience interface associated with the "Find a Provider" search experience can be presented to an end user system via one or more webpages or application pages associated with the merchant system ABC 501. The end user can generate a search query by providing information in the multiple input fields via the search experience interface. In an embodiment, the knowledge search system 500 can return one or more search results (e.g., a set of search results) corresponding to the search query.

As described above, in an embodiment, a search experience can have one or more input fields. In another embodiment, the search experience interface can be defined and established without an input field. In an embodiment, an input field can be associated with one parameter. In an example, a marketer user can adjust how an input field operates, without working with a developer user. For example, the marketer user can add a second searchable input field to a search experience interface. In an embodiment, the knowledge search system can generate and process query analytics associated with each of the input fields to generate analytics data associated with search queries executed using the input fields.

As described above, when setting up an input Field, a merchant system can select a set of parameters to include with the input field. In an embodiment, when viewing analytics, a merchant system can employ the set of parameters and one or more additional "filters" that are included via API. For example, if a user employs the knowledge search system to collect analytics data, where no input fields are employed, the one or more parameters (e.g., filters) can be presented via the interface.

In an embodiment, the one or more parameters may be identified by colors in the user interface. The merchant system can configure parameters (filters) that are displayed in association with the one or more input fields with a uniform color scheme, wherein the parameter has the same color across multiple different webpages of the merchant system.

In some embodiments, the knowledge search system can include a program library (e.g., a Javascript library), a user interface for configuration and analytics, and multiple API endpoints. In some embodiments, the program library can be used to build the search experience and corresponding search experience interface. In some embodiments, the merchant system can be given an input, section headers and result cards and the library will handle showing the results and the user interaction. Additionally, this program library may send analytics back into the knowledge manager 168.

In some embodiments, the data stored in a database associated with the knowledge search system may automatically be synced to a website associated with the merchant system in response to an end user system submission of a search query via a user device, based on the search experience created.

Figure 6A:
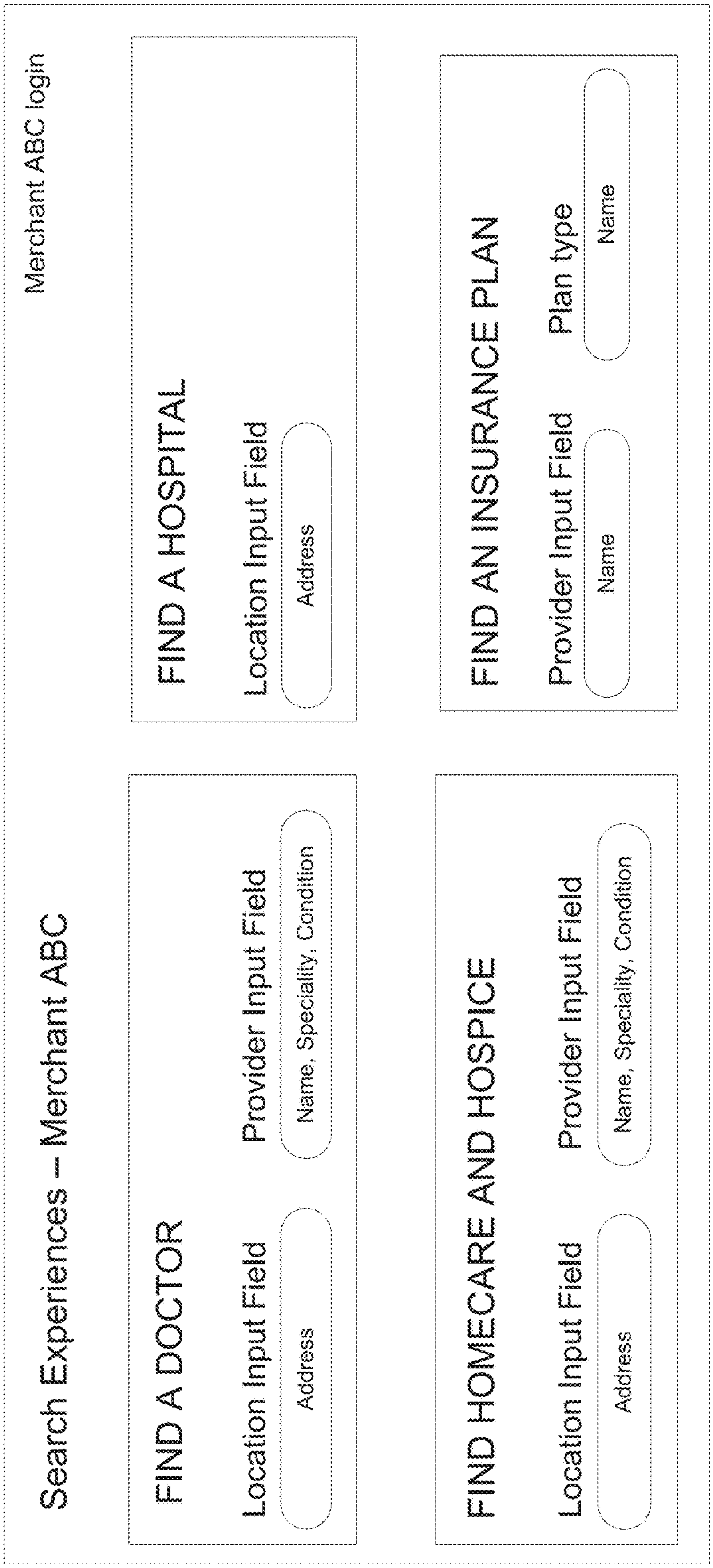
FIGS. 6A-6E show example interfaces relating to management of search experiences by a knowledge search system, according to embodiments of the present disclosure.

FIG. 6A illustrates an example interface of the knowledge search system configured to enable a merchant user to manage, change, create, and update one or more search experience types and search experience interfaces. As shown, a merchant user representing a merchant system (e.g., Merchant ABC) can login to the knowledge search system to view a display of the one or more search experiences associated with an account of the merchant system. As shown in this example, Merchant ABC has four active search experiences: a "Find a Doctor" search experience, a "Find a Hospital" search experience, a "Find Homecare and Hospice" search experience, and a "Find an Insurance Plan" search experience. For each search experience, the search experience name or label and one or more corresponding input fields are displayed. In an embodiment, each of the input fields can have one or more parameters that are either selected by the merchant system or default parameters set by the knowledge search system.

Figure 6B:
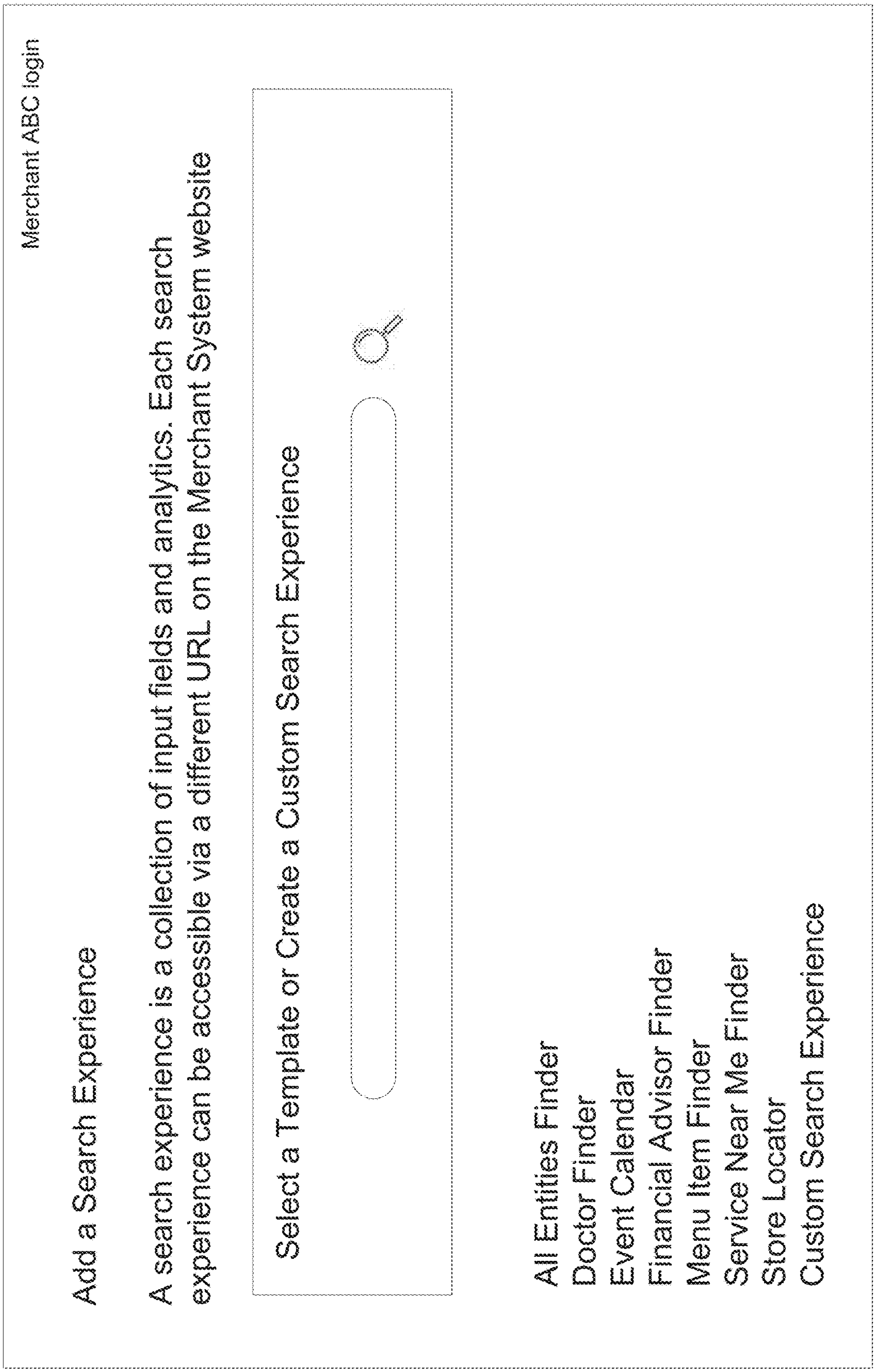

FIG. 6B illustrates an example interface generated by the knowledge search system to enable a merchant system to generate or create a new search experience. In an embodiment, the merchant user can select a new search experience from a list of pre-built templates or example search experiences (e.g., an "All Entities Finder" template, a "Doctor Finder" template, an "Event Calendar" template, a "Financial Advisor Finder" template, a "Menu Item Finder" template, a "Service Near Me Finder" template, and a "Store Locator" template) or select an option to create a custom search experience (e.g., a "Custom Search Experience" template). In an embodiment, in response to a selection of a search experience template, the knowledge search system provides the corresponding template.

Figure 6C:
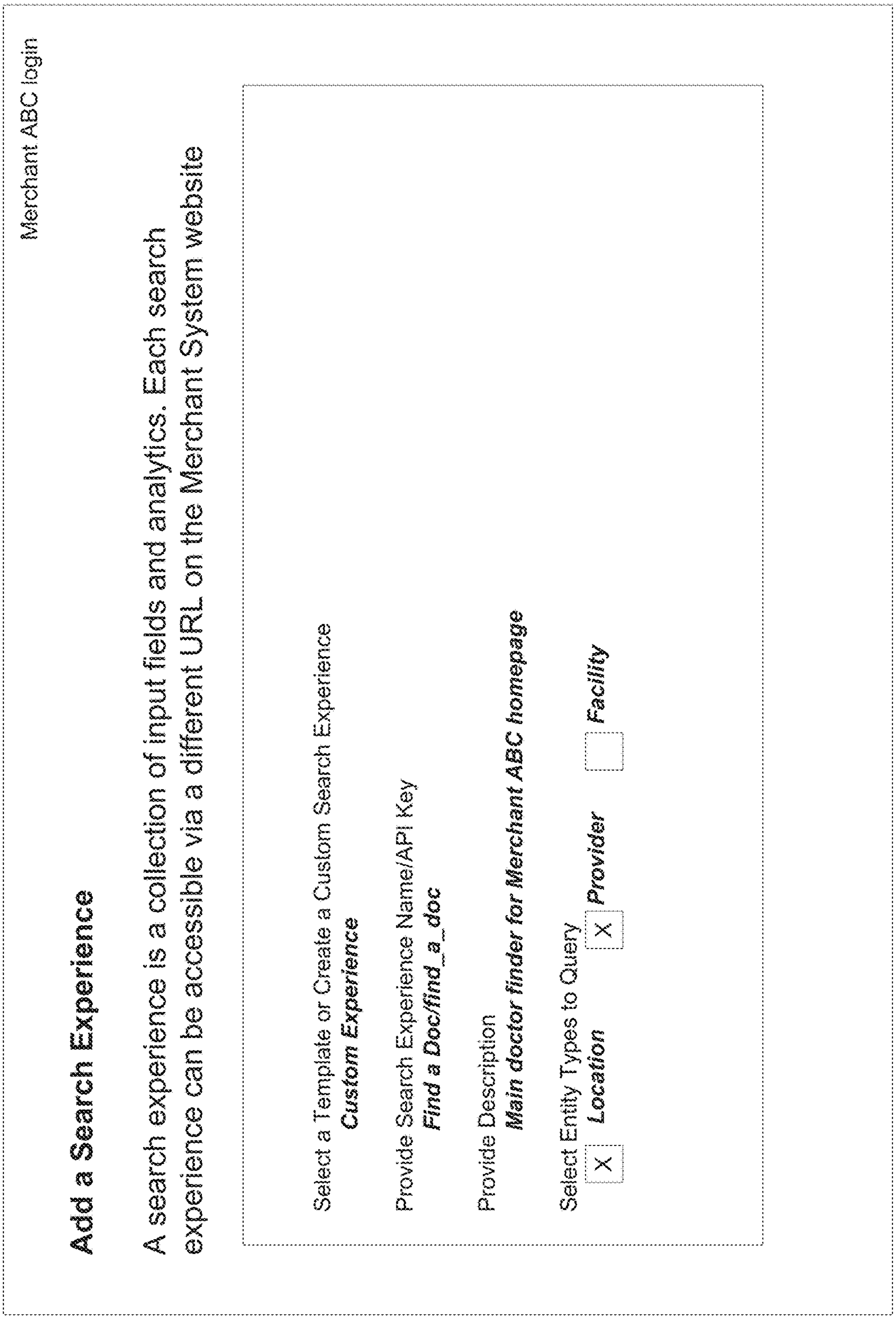

In an embodiment, if the merchant user selects the "Custom Search Experience" template, the knowledge search system provides a prompt for the merchant user to select information associated with the custom search experience, including a search experience name, a search experience or API key, a search experience description, and a list of one or more entity types that are be searched against in response to end user queries submitted using the custom search experience. Following the selection of a pre-built search experience or a custom search experience (as shown in FIG. 6C), the knowledge search system generates a search experience interface or page.

Figure 6D:
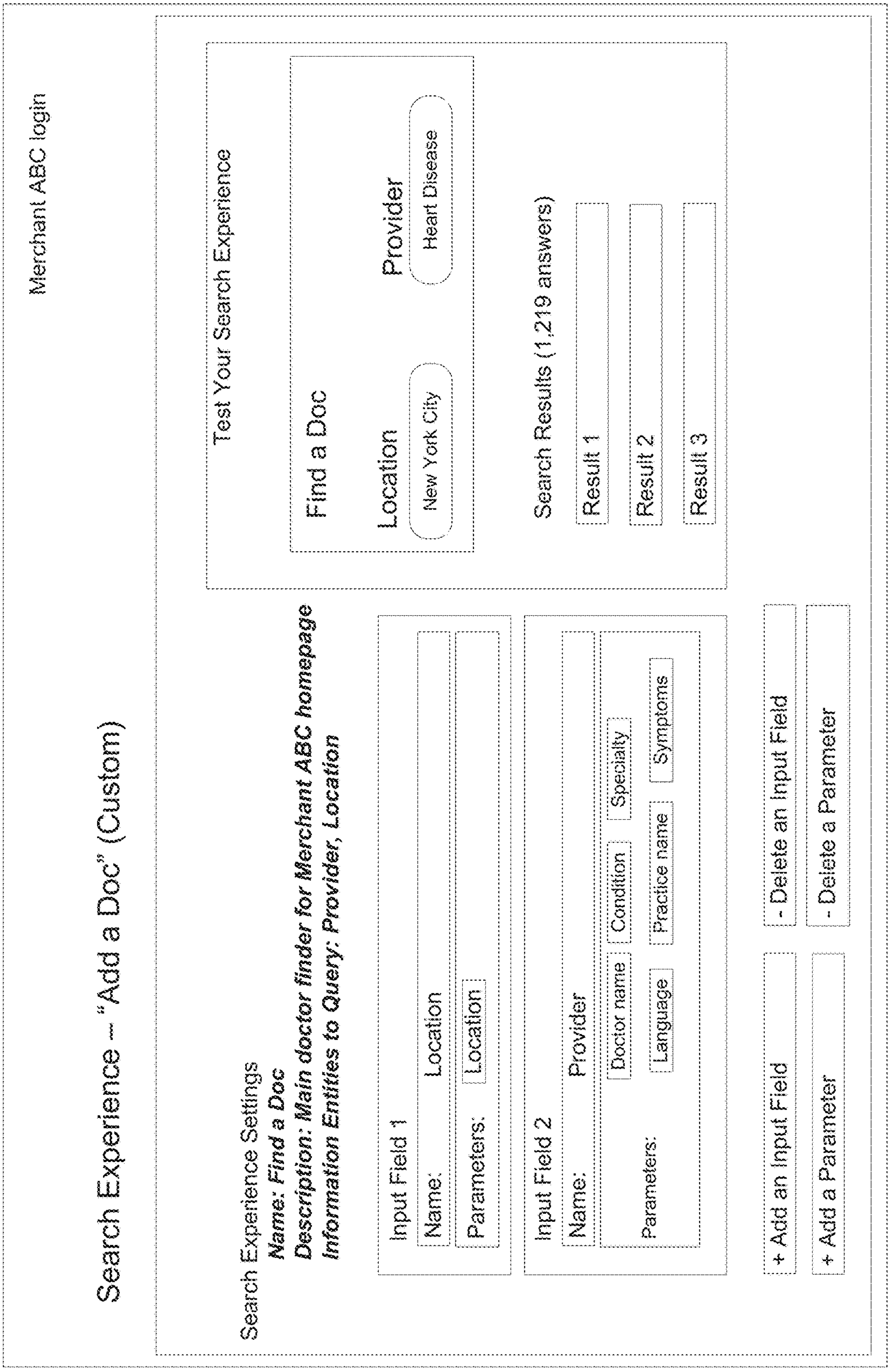

FIG. 6D illustrates an example interface generated by the knowledge search system configured to allow a merchant user to review and manage search experiences. As shown, the knowledge search system presents the settings associated with a search experience (e.g., the name, description, listing of information entities to query, etc.) and the corresponding input fields of the search experience interface. In this example, Input Field 1 is a "Location" input field having a "Location" parameter. Input Field 2 is a "Provider" input field having a set of parameters including "Doctor name", "Condition", "Specialty", "Language", "Practice name", and "Symptoms" parameters. As shown in FIG. 6D, the knowledge search system displays a "live preview" of the search experience where the merchant user can test the search experience by interacting with the input fields to execute a query to obtain search results. As shown, the merchant system can add a new input field or delete an existing input field associated with a search experience via the interface of the knowledge search system. In an embodiment, the merchant system can add or delete a parameter associated with each of the input fields.

Figure 6E:
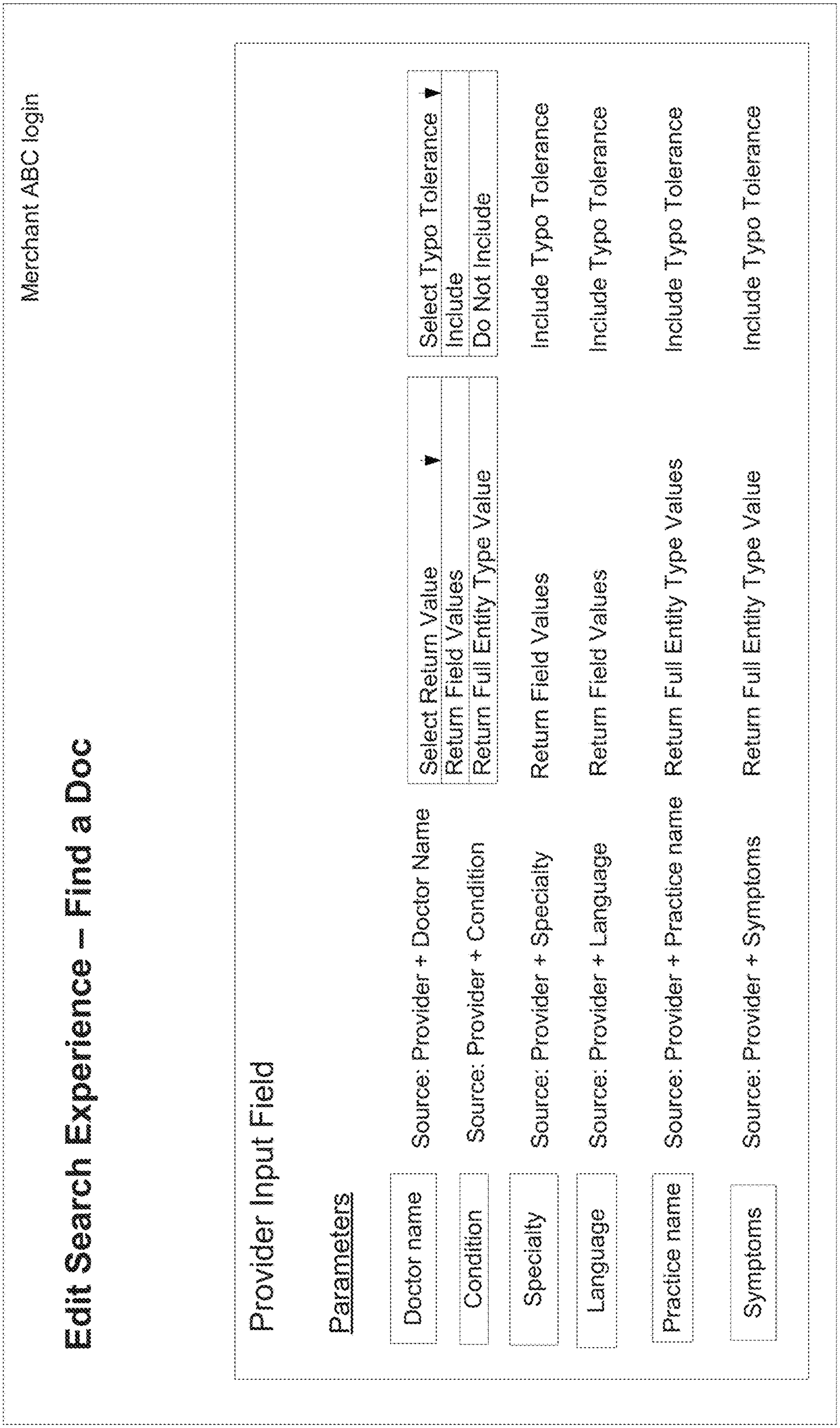

FIG. 6E illustrates an example interface generated by the knowledge search system to enable a merchant system to edit or modify a search experience. In this example, the merchant system interacts with the interface to configure settings for the parameters associated with the "Provider" input field. As shown, the return value associated with each of the parameters and the typographical error (or "typo") tolerance can be set. In an embodiment, the search experience can be customized without any specific input field. This "empty" search experience includes a generic or non-specific search field to enable an end user to submit a search query.

Figure 7A:
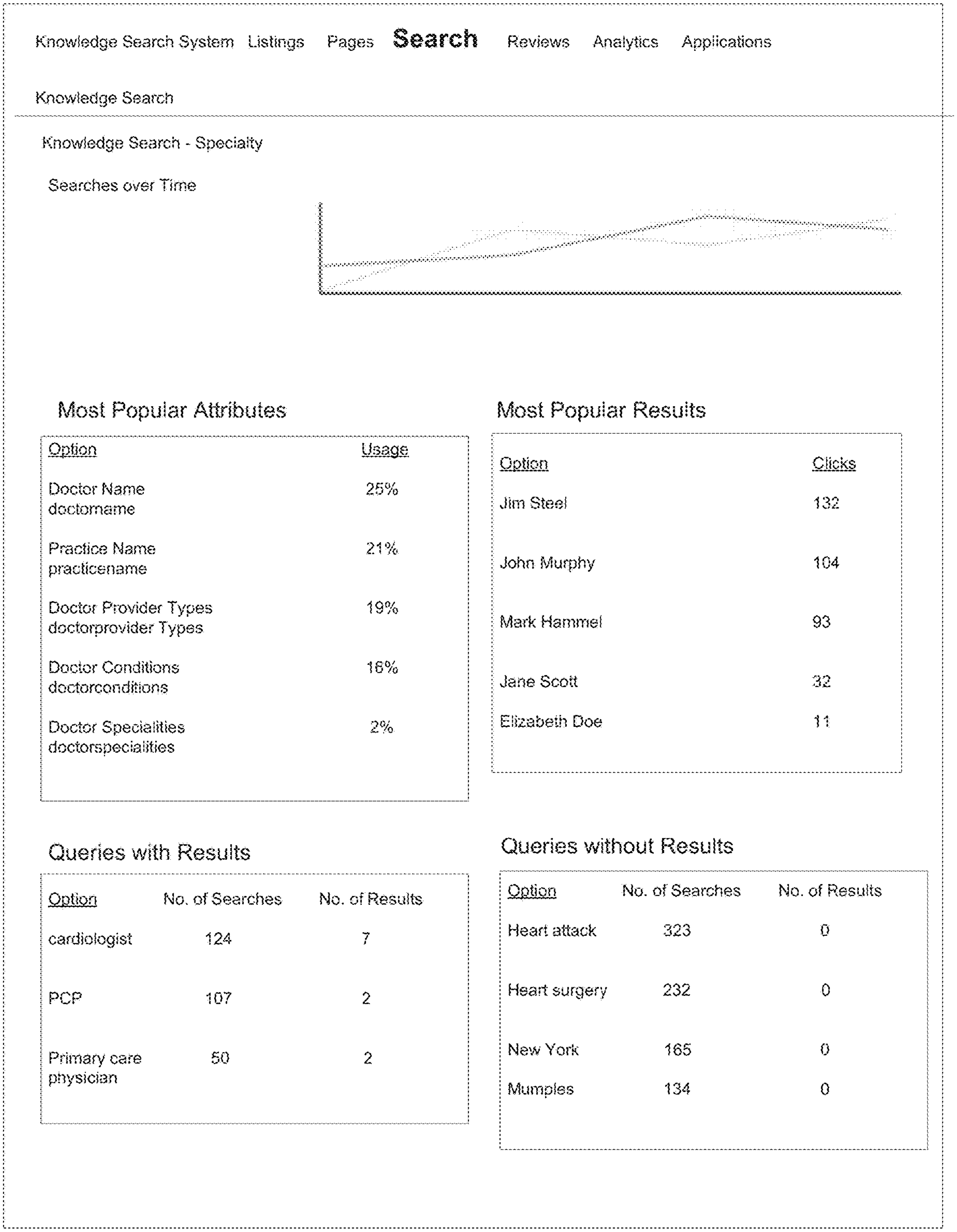

In some embodiments, the knowledge search system 100 may store (via one or more databases) the search queries of end users and present them as analytics to merchant systems. According to an embodiment, the knowledge search system 100 may allow a merchant system 101 to configure and a view analytics about a search experience. In an embodiment, a knowledge search may be provided via a tab under a "search" tab. In an embodiment, a merchant user may set up new search instances, determine which entity types and fields are searched, identify the matching logic, and configure the manner in which the search results should be ranked, as shown in FIG. 7A (e.g., analytics of a search instance). FIG. 7B illustrates an example interface relating to configuration of an example search bar.

In an embodiment, a search bar instance according to the knowledge search system may include analytics information and configuration information. Example analytics information may include one or more of the following: 1) hero numbers (e.g., total searches, average number of results, average response time, time to result, etc.); 2) high-level metrics over a period of time (e.g., number of searches over the period of time-such as, by platform (e.g., phone, tablet, desktop, etc.)), average response time, etc.); 3) a listing of frequently or commonly selected options; 4) a listing of frequently or commonly selected queries (e.g., condensed queries wherein not every character typed is presented; presenting most popular and most popular without results and most popular with no result selected).

In an embodiment, example configuration information may include one or more of the following: 1) searchable attributes; 2) other configurable settings such as API key, answer box key, group results in sections, etc.) In an embodiment, the knowledge search system may provide a merchant marketer user with one or more of the following features: 1) search as you type functionality; 2) single search across multiple entities and attributes; 3) fast and efficient searching; 4) a tailored or customizable experience depending on a given use case. In an embodiment, the knowledge search system may provide a marketer user with one or more of the following analytics based at least in part feedback directly from consumer or end users: 1) a description of how end users search; 2) a description of what end users care about; 3) identification of opportunities to improve searches; 4) identification of opportunities to improve business practices.

Figure 8:
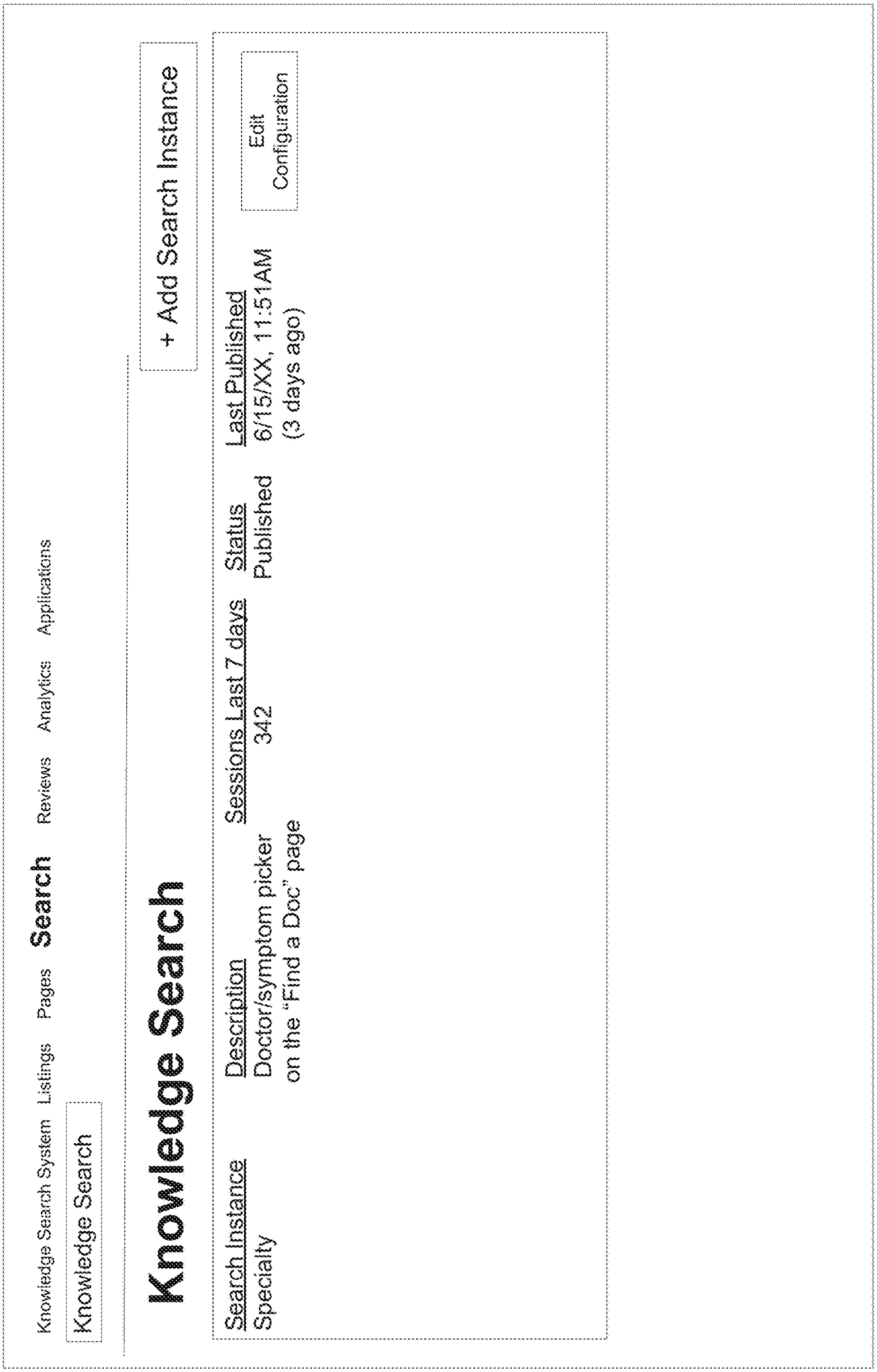
FIG. 8 illustrates an example interface relating to search experience configuration and analytics managed by a knowledge search system, according to embodiments of the present disclosure.

According to embodiments, users have a greater degree of control, as compared to conventional systems that rely on IT. For example, a user can configure what is showing up and modify results without developers or additional IT resources. FIG. 8 illustrates an example interface generated by the knowledge search system, according to embodiments of the present disclosure. FIG. 8 illustrates an example interface relating to a view of multiple search instances (e.g., all available search instances).

In an embodiment, the knowledge search system (e.g., the entity type manager 110 of the knowledge search system 100 shown in FIG. 1) enables merchant systems to establish a knowledge graph including multiple entity types (e.g., custom or system-defined) associated by one or more relationship types. The knowledge graph represents the information to data relating to the merchant system which is maintained, updated, and stored in the one or more data fields of the entity types associated with the merchant system. In an embodiment, an update to a first entity type in the knowledge graph can be distributed to one or more other entity types within the knowledge graph based on the relationship types defined between the multiple entity types.

Figure 9A:
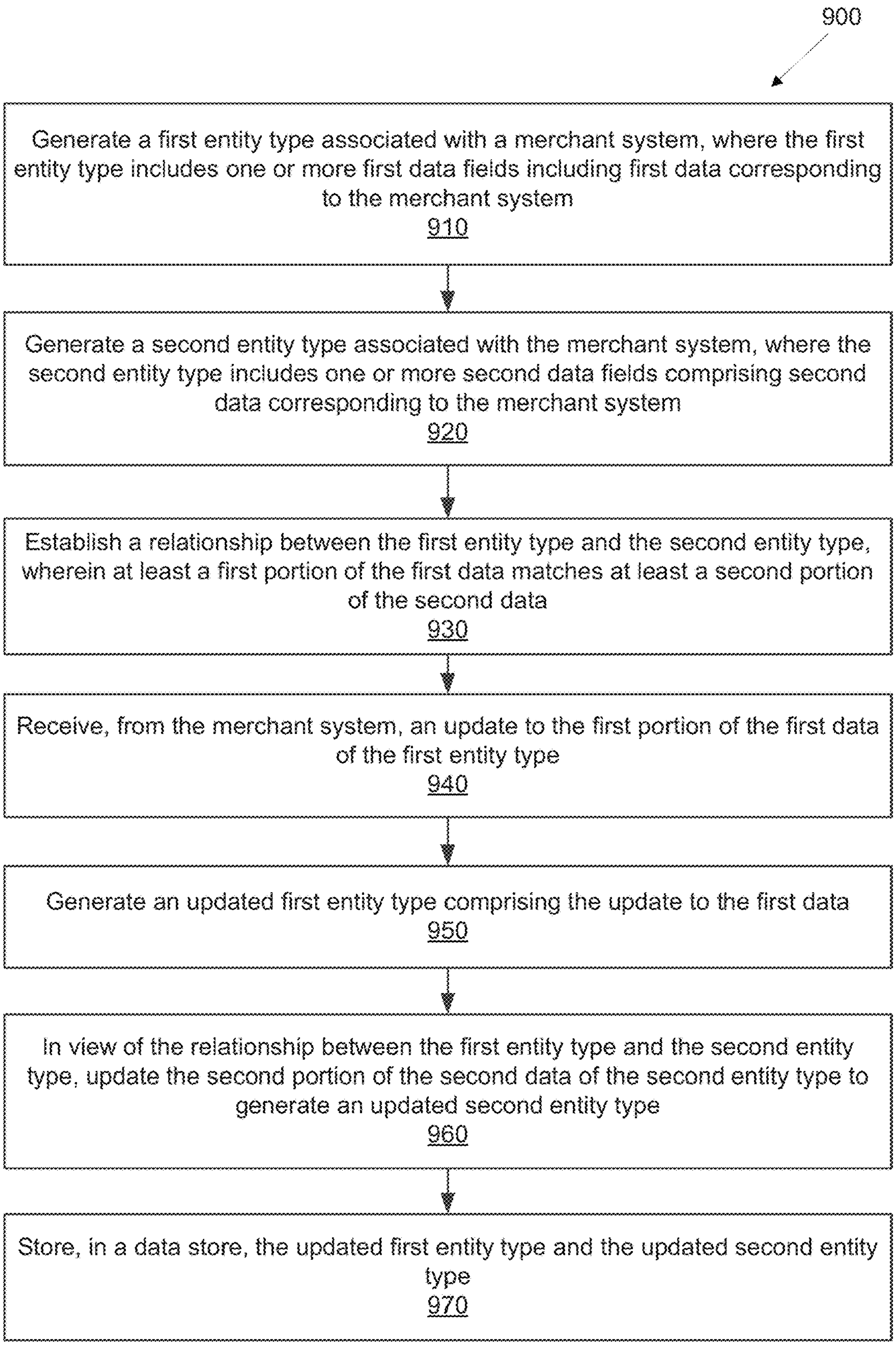
FIG. 9A illustrates a flow diagram of an example method to generate a relationship type associating multiple entity types to manage updates in a knowledge graph associated with a merchant system, according to embodiments of the present disclosure.

FIG. 9A illustrates a flow diagram of a method 900 to generate a relationship type associating multiple entity types to manage updates in a knowledge graph associated with a merchant system, according to embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the entity type manager 110 of the knowledge search system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As illustrated, at operation 910, the processing logic generates a first entity type associated with a merchant system, where the first entity type includes one or more first data fields including first data corresponding to the merchant system. In an embodiment, the first entity type can be a custom entity type (e.g., established and configured by a merchant system) or a built-in or system-defined entity type. The first entity type can include one or more data fields including data (e.g., data values) associated with the merchant system.

Figure 9B:
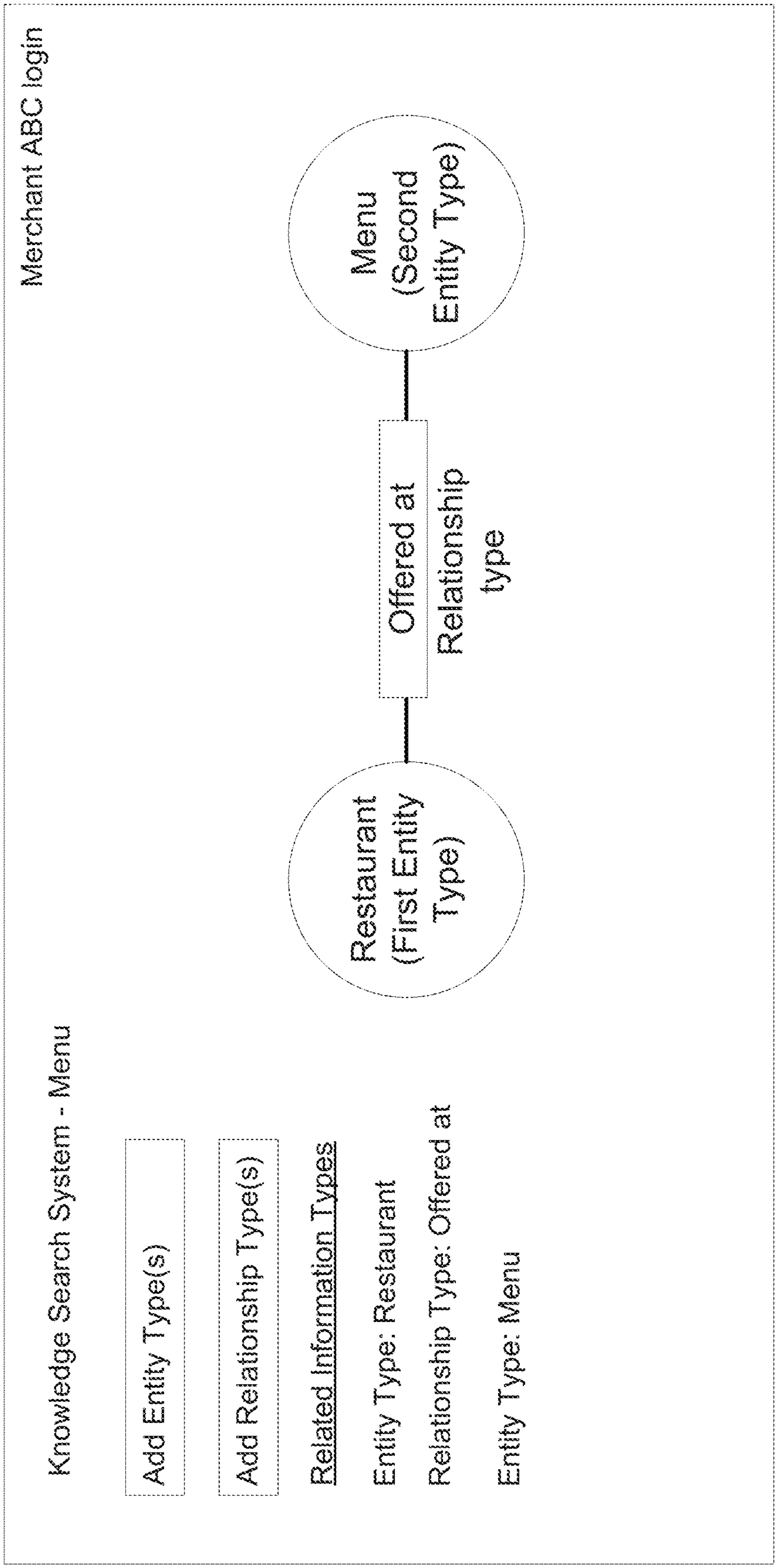
FIG. 9B-9C illustrate example interfaces relating to the generation of entity types and relationship types, according to embodiments of the present disclosure.

At operation 920, the processing logic generates a second entity type associated with the merchant system, where the second entity type includes one or more second data fields comprising second data corresponding to the merchant system. As noted above, the second entity type can be a custom entity type or a system-defined entity type. Like the first entity type, the second entity type is configured to include one or more data fields to store data associated with the merchant system. An example of a first entity type (e.g., the "Restaurant" entity type) and a second entity type (e.g., the "Menu" entity type) is shown in FIG. 9B.

At operation 930, the processing logic establishes a relationship between the first entity type and the second entity type, wherein at least a first portion of the first data matches at least a second portion of the second data. In an embodiment, the relationship is defined by a relationship type which links or associates multiple entity types. For example, as shown in FIG. 9B, the "Offered at" relationship type establishes a defined relationship between the first entity type ("Restaurant") and the second entity type ("Menu"). In an embodiment, the relationship type defines the nature of the association between multiple entity types and can be used to identify additional entity types to be updated in response to the updating of an entity type. In an embodiment, the relationship type can represent that multiple entity types share data (e.g., at least a portion of the data fields of the multiple entity types match one another).

At operation 940, the processing logic receives, from the merchant system, an update to the first portion of the first data of the first entity type. In an embodiment, the update to the first portion of the first data can include a deletion, correction, addition, reformat, change, etc. of one or more data values of the one or more data fields of the entity type. In an embodiment, the update to the first entity type can be executed via a communication or interaction between the merchant system and the knowledge search system.

At operation 950, the processing logic generates an updated first entity type including the update to the first data. In an embodiment, the updated first entity type is generated and stored in association with the merchant system.

Figure 9C:
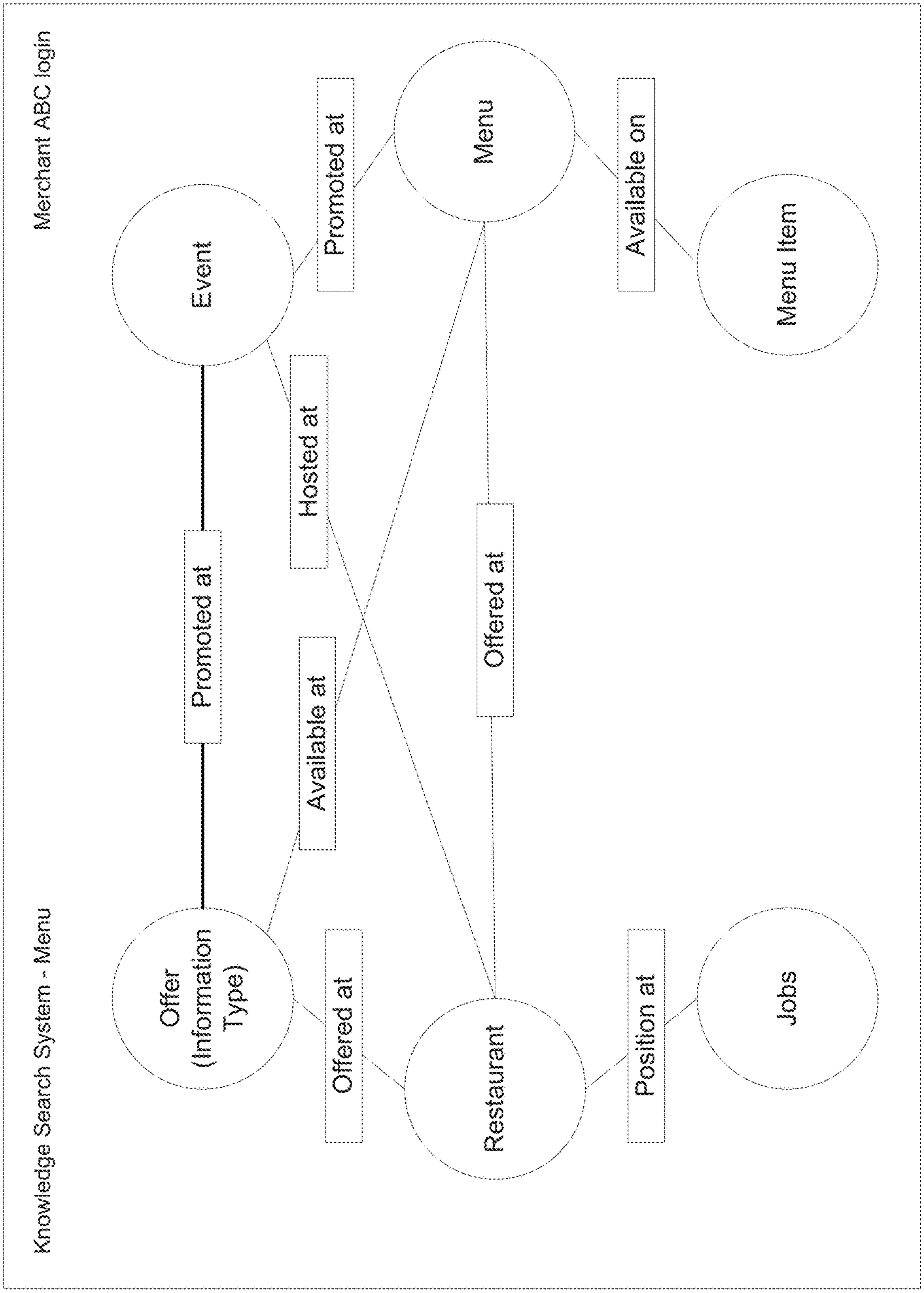

At operation 960, in view of the relationship between the first entity type and the second entity type, the processing logic updates the second portion of the second data of the second entity type to generate an updated second entity type. In an embodiment, the processing logic can, in response to the update to the first entity type, identify the relationship type between the first entity type and one or more other entity types, including the second entity type. The processing logic can use the relationship type to identify the match between a least a portion of the data of the first entity type and the data of the second entity type. In an embodiment, in this regard, the relationship type can be used to determine if the second entity type is to be updated in view of the update to the first entity type. It is noted that an entity type (e.g., the first entity type) can be associated with multiple other entity types by one or more different relationship types, as shown in the example of FIG. 9C. Advantageously, via a single interaction by the merchant system (e.g., the updating of the first data of the first entity type), one or more other entity type (e.g., the second entity type) can be updated to include the updated data, in view of the relationships types linking the entity types in the knowledge graph associated with the merchant system. In an embodiment, this advantageously enables a merchant system to initiate and make the update in a single stored location (e.g., the first entity type) and have the update distributed and "pushed" to other entity types within the knowledge graph.

At operation 970, the processing logic stores, in a data store, the updated first entity type and the updated second entity type. In an embodiment, the processing logic can distribute the updated first entity type and the updated second entity type to one or more third-party systems (e.g., business listing provider systems 180 of FIG. 1). Advantageously, the update to a first entity type can be linked to and shared to another entity type based on the established relationship. Additionally, the updated entity types can be distributed to multiple different third party systems (e.g., search engines, websites, etc.) such that a single update (e.g., the update to the first entity type) can result in the update to another entity type and updating of the information associated with a merchant in multiple different locations.

FIGS. 9B-9C illustrate example interfaces generated by the knowledge search system to enable interactions with a merchant system to generate and manage custom entity types. The various example interfaces shown in FIGS. 9B-9C illustrate various features and functionality associated with the knowledge search system, as described in greater detail below.

In an embodiment, the knowledge search system may include a large number of built-in (e.g., system-defined) entity types relating to multiple different base types (e.g., person, location, service, etc.) In an embodiment, the system-defined entity types can be specialized by vertical (e.g., person>doctor, location>healthcare professional, service>procedures for Healthcare, etc.). In an embodiment, the system-defined types are established in response to the knowledge search system coupling to a publisher network.

In an embodiment, the knowledge search system provides system-defined entity types and custom entity types. In an embodiment, the knowledge search system provides inheritance functionality which enables entity types (either system-define or custom) to build on other entity types. In an example, the knowledge search system can categorize the entity types to enable an "answer" (i.e., search result) to an example search query of: get me all people entities for my org, wherein the org is set up with: staff, executive, engineer, etc.

In an embodiment, the knowledge search system enables merchant systems to store data about the entity types and define how the entity types are related by establishing associated relationship types between multiple entity types. For example, a first entity type ("doctor") can be associated with a second entity type ("location") by a first relationship type ("works at") to link or relate the multiple entity types. In addition, in this example, the first entity type ("doctor") can be associated with a third entity type ("medical procedure") by a second relationship type ("specializes in") to link the first entity type and the third entity type. In this example, the knowledge search system generates a mapping or association between the multiple entity types in view of the identified relationship type to establish the following relationships: a doctor "works at" a location and "specializes in" a medical procedure. In an embodiment, the knowledge search system can add a custom entity type (at the direction of a merchant system) and can monitor and observe how merchant systems interact with the knowledge search system to track how the merchant systems manage the custom entity types and the relationships between the entity types.

In some embodiments, a merchant system can create custom entity types and relationships between multiple entity types (e.g., custom or built in entity types). For example, in FIG. 9A, a merchant system can interact with the knowledge search system to manage entity types and corresponding relationship types. In an example, the merchant system can establish a relationship ("Offered at") between a first entity type ("Restaurant") and a second entity type ("Menu"). In an embodiment, the first entity type and the second entity type can be system-defined entity types, custom entity types, or a combination thereof.

FIG. 9B illustrates an example set of entity types linked together by relationships, generated in accordance with embodiments of the present disclosure. In an embodiment, the knowledge search system establishes the multiple entity types (e.g., "Offer", "Restaurant", "Event", "Jobs", "Menu", and "Menu item") and establishes multiple relationships (e.g., "Offered at", "Position at", "Promoted at", "Available on", "Available at") between different pairs of the entity types. For example, the entity type labeled "Jobs" can be a system-defined entity type and the entity type "Offers" can be a custom entity type. In an embodiment, a merchant system can create a custom entity type for limited time offers for specific restaurants. Those limited time offers may be discounts of certain menu items (e.g., free French fries with any purchase of a hamburger) offered at certain restaurants. A merchant system can define which restaurants (e.g., the relationship between the restaurant and offer entity types) those offers are offered at (e.g., all, a subset, etc.), and which menu items are involved in such offer (e.g., relationship between menu items and offer).

In some embodiments, if the offer changes (e.g., free soda with any purchase of a hamburger), a merchant system can update the corresponding entity type (e.g., the offer entity type). For example, if a merchant system changes the offer in the "Offers" entity type, that offer is automatically changed in connection with the restaurants the offer is offered at and the menu items by virtue of the established relationship between the entity types.

Figure 10:
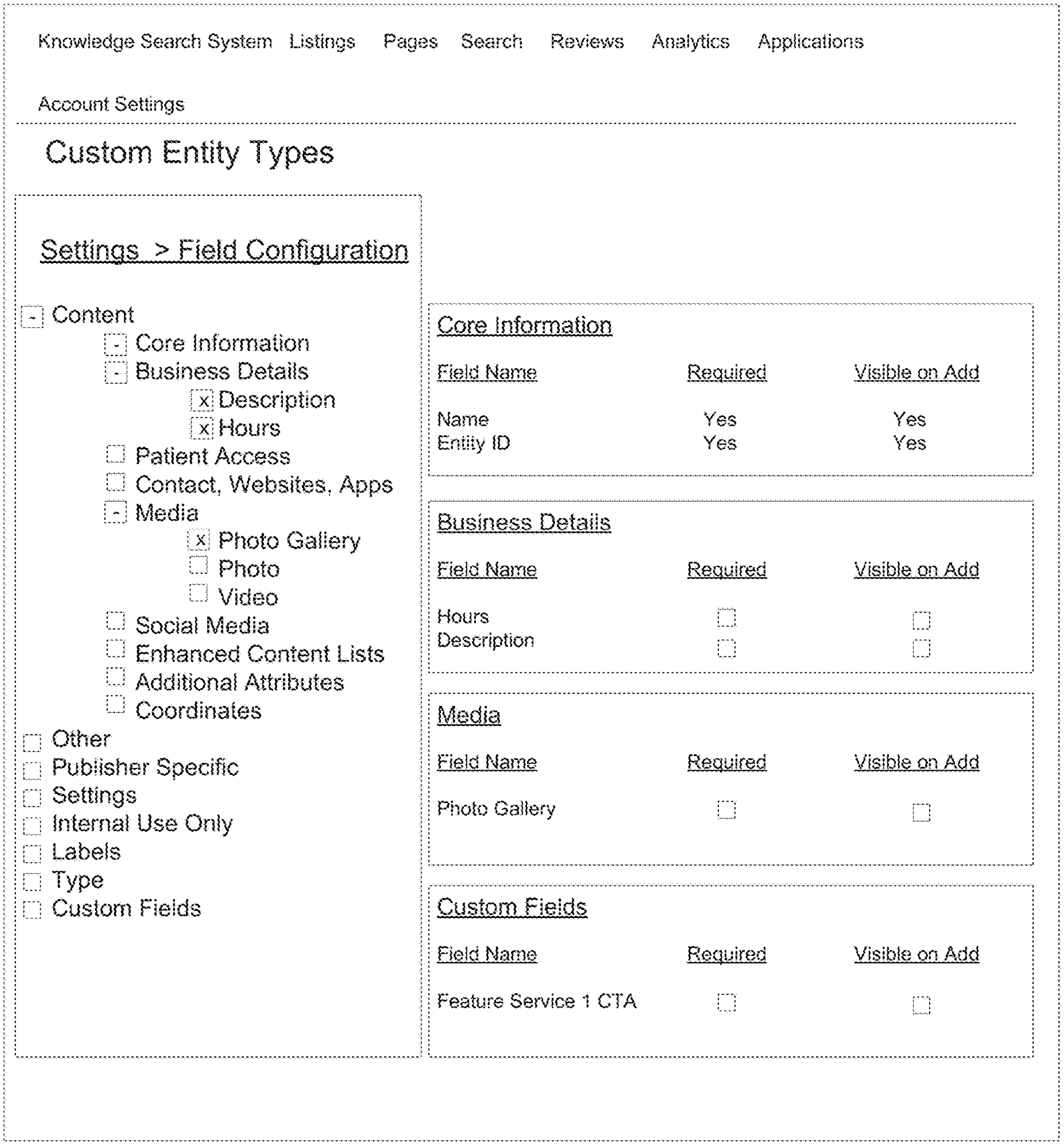
FIG. 10 illustrates an example interface to the generation of fields relating to a custom entity type generated by a knowledge search system, according to embodiments of the present disclosure.

In an embodiment, if a merchant has a different first party web page for a menu, limited time offer and restaurant locations, that information can be automatically updated across all web pages. In an embodiment, the merchant information can be updated in the one or more databases of the knowledge search system across the one or more entity types associated with the merchant system. For example, the menu can be updated to show the new limited time offer, the particular restaurant locations where the offer is offered can be updated (e.g., via a corresponding API) to display the new offer, and the limited time offer webpage can be updated to display the new offer. In other embodiments, the knowledge search system can update the information across third-party websites (e.g., online listing publishers, search engines, etc.), for example, via a corresponding API, in response to the update of the information type by the merchant system. FIG. 10 illustrates an example interface generated by the knowledge search system to enable a merchant system to create, update, and manage a custom information type, according to embodiments of the present disclosure. In an embodiment, the knowledge search system can generate relationship types to relate entity types using unidirectional linked custom field types as either standalone or as part of a custom field type that contains other properties. In an embodiment, the knowledge search system includes system-defined entity types and relationships based on consumer feedback and observations. For example, the knowledge search system is configured to provide information relating to example analytics including, but not limited to: what motivates a customer to add an entity to the knowledge search system; when does some information deserve to be an entity type versus a property of another entity type; what entity types the various merchant systems generate, use, and store in the knowledge search system; how relationship types are used in the knowledge search system; whether relationship types can be converted to entity types to contain additional data or are relationship types properties of an entity type; the data the merchant systems store relating to do customers want to store about their entities; how merchant systems use entity types in downstream end-user facing services, etc.

In an embodiment, custom entity types can be used to enable storage of data in the knowledge search system to enable merchant systems to use the custom entity types with one or more other example systems and features: knowledge Pages, consulting pages, knowledge search, listings, reviews, and analytics.

In an embodiment, the knowledge search system may provide compatibility between custom and built-in entity types. For example, if a merchant system user adds a custom entity type named "Vehicle" and the knowledge search system subsequently adds a built-in type for "Vehicle", the knowledge search system may enable the merchant system to migrate or take advantage of the functionality of the built-in type. In an embodiment, the knowledge search system enables merchant systems to manage which entity types are enabled in their account. In an embodiment, the knowledge search system may provide a customer with a recommended custom entity type based on historical data relating to the manner in which other merchant systems create custom entity types. In some embodiments, a merchant system can create custom records, such as, for example, records relating to limited time offers, dealership groups, or product launches to reflect everything that makes its brand unique. In an embodiment, in response to a merchant system adding a new employee or creating a new special offer, the knowledge search system can update all the corresponding relationships. In an embodiment, the knowledge search system can update one or more connected search experiences in response to a change in the information provided by the merchant system.

In some embodiments, a merchant system may create a custom entity type that is not supported by one or more thirty party websites or applications. In some embodiments, the knowledge search system can review the custom entity type requested by the merchant system and recommend an alternative built-in entity type that is supported by the one or more third-party websites or applications. In such instances, the merchant system can choose to migrate all of the data in the custom entity type to the built-in entity type and synchronize that data and the entity type with the third-party websites and applications. In other embodiments, the knowledge search system can migrate all data from the custom entity types to the supported built-in entity type and synchronize the related data to the third-party websites or applications.

In other embodiments, the knowledge search system can alter the data structure on the third-party websites or applications to enable support for custom entity types. In such embodiments, the custom entity types may be "locked" so that the third-party websites cannot change the structure. In other embodiments the knowledge search system can assess the entity types of certain merchant systems to recommend those entity types to similar merchant systems. In some embodiments, the recommendations may be done based on a recommendation rule that is created to enable the sending of notifications to applicable merchant users that manage such data on behalf of the merchant system.

In an embodiment, the knowledge search system provides functionality relating to custom entity types that enable a merchant system to create, update or delete one or more custom entity types. In an embodiment, the knowledge search system enables a merchant system to view, enable or disable entity types in the merchant system account.

According to embodiments of the present disclosure, the knowledge search system may provide custom entity types that are specific to a merchant account or sub-account. In an embodiment, a merchant system may define one or more of the fields associated with the custom entity type. In an embodiment, the custom entity types may be available via one or more of the services (e.g., information edit, approvals, scheduled updates, templates, upload, export, knowledge search system API, Live API, ML Profiles, custom goals, advanced filters, etc.).

In an embodiment, the knowledge search system may provide a field registry configured to enable entity types to be defined by a specific category (e.g., by business). In an example, fields may be handled based on subscription features, like publisher fields. In an embodiment, the knowledge search system provides flexibility to support features that enables users to make custom field types and custom fields available to sub-accounts.

In an embodiment, the knowledge search system provides for management of information schema and management of entity types. In an embodiment, information schema is managed by establishing entity type properties such that each entity type (e.g., built-in entity types and custom entity types) have a corresponding set of properties. In an embodiment, for custom entity types, a merchant system can control one or more properties, such as, for example, the following example properties: name, API name, description, entity type group, availability to sub-accounts, entity type icon, merchant system data, representation of entity type in tabular form, fields, etc.

In an embodiment, one or more "fields" associated with a custom entity type may be defined by a merchant system using the knowledge search system. In an embodiment, after creating the entity type, the merchant system can view a list of available fields and select one or more fields to add to the entity type. In an example, by default, the entity types can include the following fields: entity type identifier (ID) field and a name field.

In an embodiment, for additional fields of the custom entity type, the merchant system can perform one or more of the following actions: 1) specify whether the field is required for that type (e.g., a centralized notion of required fields across all interfaces may be employed); and 2) specify whether the field should appear on the "Add" screen.

In an embodiment, merchant systems can view and enable or disable available entity types in their account. In an embodiment, the following aspects may be considered: 1) determine whether the entity type is settable by the merchant system (e.g., determine whether the merchant user can view it in a "manage entity type" table to enable or disable); 2) if settable, determine whether the entity type is enabled or disabled in the account (e.g., determine whether the merchant system add an instance of the entity type); 3) if enabled, determine which entity type is the primary type in the account (e.g., determine the default type).

In an embodiment, if an entity type is "settable", the merchant system can enable or disable the type in the knowledge search system. In an embodiment, there is a global setting for "settable," (where an indication of "no" is used for entity types that are in testing), that can be managed for a particular business (with inheritance for sub-accounts where applicable) to enable the knowledge search system to turn entity types "on" for specific accounts for testing and hide entity types for merchant systems in certain instances.

In an embodiment, a merchant system can delete a custom entity type (e.g., if there are no unarchived instances of the type and the type is disabled) such that the "customer settable" field is updated to "no".

In an embodiment, for an entity type that is customer settable, a merchant system can enable or disable the type in the knowledge search system. In an embodiment, given an entity type is enabled, each account may have a primary type. In an embodiment, a primary type can be set for sub-accounts.

In an embodiment, the knowledge search system can utilize the entity types that are generated and enabled to perform various operations and functions, including, for example, filtering based on entity type, generate templates for entity types, export entity types, upload custom entity types, select an entity type, create a webpage for an entity type, search for data relating to an entity type, add a user role in association with an entity type, generate analytics relating to the entity type, generate an activity report relating to an entity type, generate an entity type tree organized by group, etc.

According to embodiments of the present disclosure, natural language processing may be performed using a knowledge graph, which can be generated by the entity type manager 110. In an embodiment, the knowledge search system may suggest results in a drop down list based on information stored in a knowledge graph associated with a merchant system. For example, an end user may execute a search query for an insurance agent that speaks a particular language. After the end user searches for "agent that speaks" the drop down list is displayed including languages that are added to the knowledge graph by the merchant system. In an embodiment, the knowledge search system returns an "answer" (e.g., search results responsive to the search query) in the drop down list based on the information stored in the knowledge graph associated with the merchant.

In an example, a merchant system may update their holiday hours in their knowledge graph (e.g., Hours for New Year's Day=12 PM-3 PM). If an end user customer initiates a search, on December 30th, "Holiday Hours for"—The results "Holiday Hours for New Year's Day=12 PM-3 PM" may be returned in the drop down list, such that the end user does not have to execute the full search (e.g., interact with or click a "search" button or link).

In another embodiment, search results can be returned in the form of a drop down list. In an example, a chat or structured map can be returned, and a "clicking" on the search link may not be needed.

In an embodiment, the knowledge search system may use analytics from search data to power a notification or "knowledge nudge". In an embodiment, analytics are displayed and used to provide recommendations in the knowledge search system, such that merchant systems can set up recommendation rules based on the recommendations provided by the knowledge search system. In an embodiment, an end user may conduct a search on a merchant website-such as, looking for doctor specialties for a particular office of the merchant. In an example, the requested information may not exist in the data graph associated with the merchant system. In this example, the knowledge search system may use analytics to recommend updating that information and/or creating a notification rule to remind other users (e.g., other offices associated with the merchant system) to update the "doctor specialties" information. In an embodiment, the knowledge search system may create a notification rule based on the analytics and send it to the user (e.g., a merchant user) in charge of that information.

In another example, an end user may search for doctors in a particular location specializing in nutrition. In this example, if no information is identified, a notification rule may be created to inform platform users (e.g., merchant users) in particular locations to update that information in their account.

Figure 11:
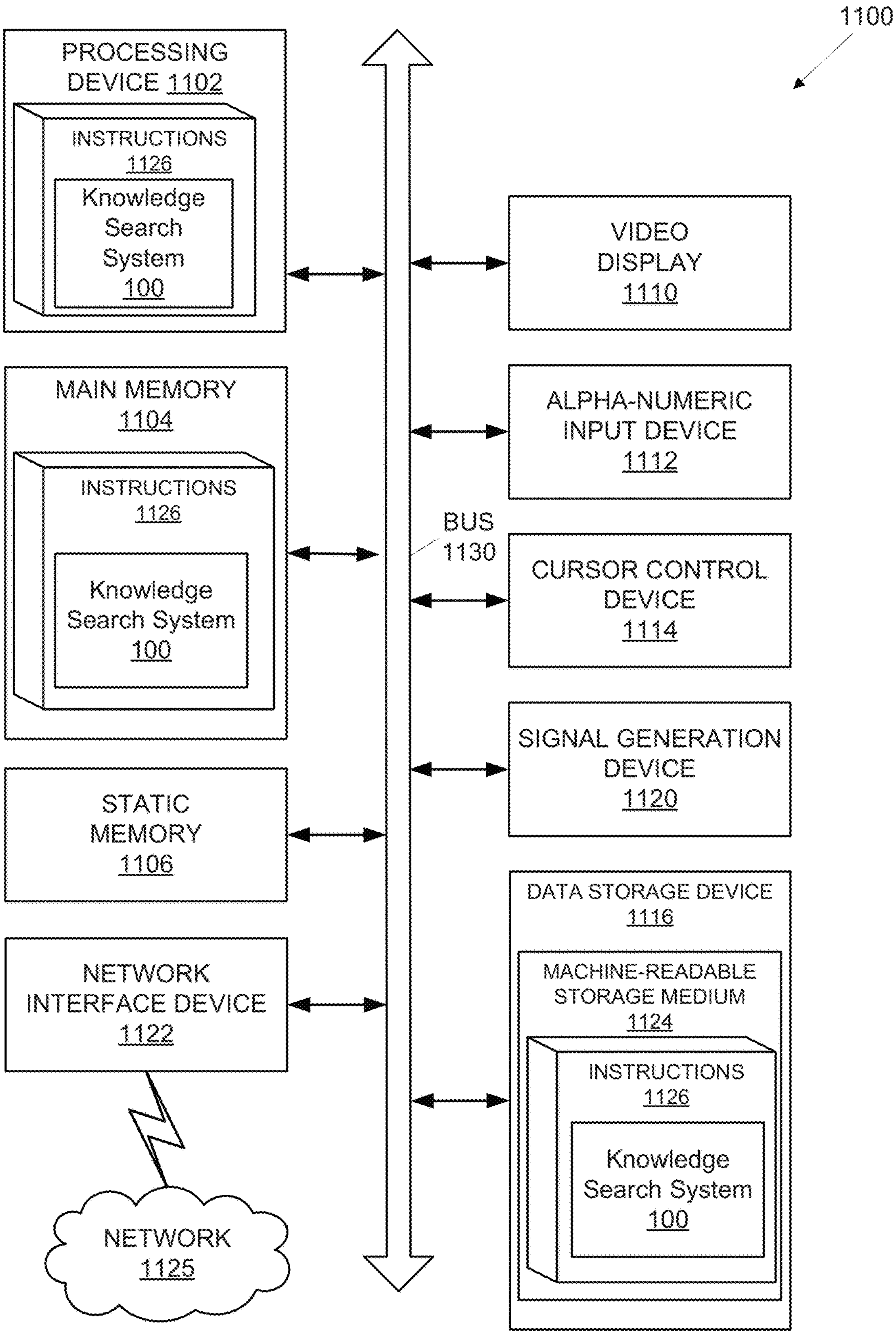
FIG. 11 is a block diagram of an example computer system in which implementations of the present disclosure can operate.

FIG. 11 illustrates an example computer system 1100 operating in accordance with some embodiments of the disclosure. In FIG. 11, a diagrammatic representation of a machine is shown in the exemplary form of the computer system 1100 within which a set of instructions, for causing the machine to perform any one or more of the methodologies discussed herein, may be executed. In alternative embodiments, the machine 1100 may be connected (e.g., networked) to other machines in a local area network (LAN), an intranet, an extranet, or the Internet. The machine 1100 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 1100. Further, while only a single machine is illustrated, the term "machine" shall also be taken to include any collection of machines that individually or jointly execute a set (or multiple sets) of instructions to perform any one or more of the methodologies discussed herein.

The example computer system 1100 may comprise a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1116), which may communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute a knowledge search system 100 for performing the operations and steps discussed herein. For example, the processing device 1102 may be configured to execute instructions implementing the processes and methods described herein, for supporting a knowledge search system 100, in accordance with one or more aspects of the disclosure.

Example computer system 1100 may further comprise a network interface device 1122 that may be communicatively coupled to a network 1125. Example computer system 1100 may further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1120 (e.g., a speaker).

Data storage device 1116 may include a computer-readable storage medium (or more specifically a non-transitory computer-readable storage medium) 1124 on which is stored one or more sets of executable instructions 1126. In accordance with one or more aspects of the disclosure, executable instructions 1126 may comprise executable instructions encoding various functions of the knowledge search system 100 in accordance with one or more aspects of the disclosure.

Executable instructions 1126 may also reside, completely or at least partially, within main memory 1104 and/or within processing device 1102 during execution thereof by example computer system 1100, main memory 1104 and processing device 1102 also constituting computer-readable storage media. Executable instructions 1126 may further be transmitted or received over a network via network interface device 1122.

While computer-readable storage medium 1124 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "selecting," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A system comprising:

a memory to store instructions; and a processing device operatively coupled to the memory the processing device to execute the instructions to:

receive a first selection from a merchant system of a first input field;

receive a second selection from the merchant system of a second input field;

generate a search experience interface comprising the first input field and the second input field;

displaying the search experience interface to an end user system;

receive, from the end user system, a first search term provided via the first input field of the search experience interface;

receive, from the end user system, a second search term provided via the second input field of the search experience interface;

execute a search of a set of data associated with the merchant system in view of the first search term and the second search term;

receive, from the end user system, analytics information associated with the search experience interface, wherein the analytics information is based at least in part on the first search term and the second search term received via the first input field and the second input field, respectively;

provide for display to the merchant an analytics interface comprising the analytics information; and configure, by the merchant system, a ranking of one or more search results associated with the search based on the analytics information.

2. The system of claim 1, the processing device to execute the instructions to:

associate the first input field with a first set of parameters; and display the first set of parameters in connection with the first input field in the search experience interface.

3. The system of claim 2, wherein the first search term corresponds to a first parameter of the first set of parameters.

4. The system of claim 1, the processing device to execute the instructions to:

generate a first entity type associated with the merchant system, wherein the first entity type comprises one or more fields comprising first data of the set of data associated with the merchant system; and generate a second entity type associated with the merchant system, wherein the second entity type comprises one or more fields comprising second data of the set of data associated with the merchant system.

5. The system of claim 4, wherein execution of the search comprising accessing the first data of the first entity type and the second data of the second entity type.

6. The system of claim 4, wherein the first entity type is a custom entity type generated in response to one or more inputs received from the merchant system.

7. The system of claim 4, the processing device to execute the instructions to:

receive an update to the first data of the first entity type;

in response to receiving the update to the first data, generating an updated first entity type; and distribute the updated first custom entity type to a plurality of business listing provider systems configured to provide search results associated with the merchant system in response to a search query from an end user system, wherein the search results comprise the update to the first data.

8. The system of claim 4, the processing device to execute the instructions to:

generate a relationship type between the first entity type and the second entity type, wherein the relationship type represents a relationship between the first entity type and the second entity type.

9. The system of claim 1, wherein the search is executed in response to receipt of a single indication of a search action from the merchant system.

10. A non-transitory computer readable storage medium having instructions that, when executed by a processing device, cause the processing device to:

receive a first selection from a merchant system of a first input field;

receive a second selection from the merchant system of a second input field;

generate a search experience interface comprising the first input field and the second input field;

displaying the search experience interface to an end user system;

receive, from the end user system, a first search term provided via the first input field of the search experience interface;

receive, from the end user system, a second search term provided via the second input field of the search experience interface;

execute a search of a set of data associated with the merchant system in view of the first search term and the second search term;

receive, from the end user system, analytics information associated with the search experience interface, wherein the analytics information is based at least in part on the first search term and the second search term received via the first input field and the second input field, respectively;

provide for display to the merchant an analytics interface comprising the analytics information; and configure, by the merchant system, a ranking of one or more search results associated with the search based on the analytics information.

11. The non-transitory computer readable storage medium of claim 10, the processing device to:

associate the first input field with a first set of parameters; and display the first set of parameters in connection with the first input field in the search experience interface, wherein the first search term corresponds to the first set of parameters.

12. The non-transitory computer readable storage medium of claim 10, the processing device to:

generate, in view of the first search term, a notification comprising a recommendation relating to the set of data;

provide the notification to the merchant system;

in response to the notification, receive additional data from the merchant system to include in the set of data; and generate, based on the additional data, an entity type associated with the merchant system.

13. The non-transitory computer readable storage medium of claim 10, the processing device to:

generate a first entity type associated with the merchant system, wherein the first entity type comprises one or more fields comprising first data of the set of data associated with the merchant system; and generate a second entity type associated with the merchant system, wherein the second entity type comprises one or more fields comprising second data of the set of data associated with the merchant system.

* * * * *